United States Patent
Paripovic et al.

(10) Patent No.: US 12,460,061 B2
(45) Date of Patent: Nov. 4, 2025

(54) EXPANDABLE MATERIAL WITH IMPROVED THERMAL INSULATION PROPERTIES AND USE THEREOF

(71) Applicant: SIKA TECHNOLOGY AG, Baar (CH)

(72) Inventors: Dusko Paripovic, Zürich (CH); Christian Hardt, Kelsterbach (DE); Jan Spengler, Breuberg (DE); Jean Georges Becker, Worms (DE); Achim Kohl, Laumersheim (DE)

(73) Assignee: SIKA TECHNOLOGY AG, Baar (CH)

( * ) Notice: Subject to any disclaimer, the term of this patent is extended or adjusted under 35 U.S.C. 154(b) by 226 days.

(21) Appl. No.: 18/026,369

(22) PCT Filed: Nov. 8, 2021

(86) PCT No.: PCT/EP2021/080885
§ 371 (c)(1),
(2) Date: Mar. 15, 2023

(87) PCT Pub. No.: WO2022/101118
PCT Pub. Date: May 19, 2022

(65) Prior Publication Data
US 2024/0018327 A1    Jan. 18, 2024

(30) Foreign Application Priority Data
Nov. 11, 2020   (EP) .................................... 20207045

(51) Int. Cl.
*C08J 9/32*       (2006.01)
*A47L 15/42*      (2006.01)
(Continued)

(52) U.S. Cl.
CPC .............. *C08J 9/32* (2013.01); *A47L 15/4209* (2016.11); *B32B 5/18* (2013.01); *B32B 5/20* (2013.01);
(Continued)

(58) Field of Classification Search
CPC .......... C08J 9/32; C08J 9/0061; C08J 9/0066; A47L 15/4209; B32B 5/18; B32B 5/20;
(Continued)

(56) References Cited

U.S. PATENT DOCUMENTS 4,798,756 A * 1/1989 Fukushima ............... B32B 5/18
428/317.1
6,110,985 A   8/2000 Wheeler
(Continued)

FOREIGN PATENT DOCUMENTS

EP       0617098 A1    9/1994
EP       2615130 A1    7/2013
(Continued)

OTHER PUBLICATIONS

Ries et al., "Foam Injection Molding of Thermoplastic Elastomers: Blowing Agents, Foaming Process and Characterization of Structural Foams," Proceeding of PPS-29, AIP Conf. Proc., 2014, vol. 1593, pp. 401-410.
(Continued)

*Primary Examiner* — Forrest M Phillips
(74) *Attorney, Agent, or Firm* — Oliff PLC

(57) ABSTRACT

A thermally expandable composition includes at least one polymer P, at least one chemical blowing agent CBA, at least one physical blowing agent PBA composed of expandable microspheres, and at least one filler F. A damping element includes a first layer composed of an expansion material and a second layer composed of an acoustic damping material. The damping element is suitable for providing vibration and/or noise damped systems.

25 Claims, 1 Drawing Sheet

(51) Int. Cl.
| | |
|---|---|
| *B32B 5/18* | (2006.01) |
| *B32B 5/20* | (2006.01) |
| *B32B 27/06* | (2006.01) |
| *B32B 27/20* | (2006.01) |
| *B32B 27/22* | (2006.01) |
| *B60R 13/08* | (2006.01) |
| *B62D 25/06* | (2006.01) |
| *C08J 9/00* | (2006.01) |

(52) U.S. Cl.
CPC ............ *B32B 27/065* (2013.01); *B32B 27/20* (2013.01); *B32B 27/22* (2013.01); *B60R 13/0815* (2013.01); *C08J 9/0061* (2013.01); *C08J 9/0066* (2013.01); *B32B 2307/102* (2013.01); *B32B 2307/304* (2013.01); *B32B 2307/72* (2013.01); *B32B 2509/00* (2013.01); *B32B 2605/00* (2013.01); *B62D 25/06* (2013.01); *C08J 2203/04* (2013.01); *C08J 2203/184* (2013.01); *C08J 2203/22* (2013.01); *C08J 2323/08* (2013.01); *C08J 2423/08* (2013.01); *C08J 2497/02* (2013.01)

(58) Field of Classification Search
CPC ....... B32B 27/065; B32B 27/20; B32B 27/22; B60R 13/0815
See application file for complete search history.

(56) References Cited

U.S. PATENT DOCUMENTS

| | | |
|---|---|---|
| 6,930,138 B2 | 8/2005 | Schell et al. |
| 8,507,075 B2 * | 8/2013 | Filipczak ............... B60J 5/0418 296/146.7 |
| 8,997,920 B2 * | 4/2015 | Fuhrmann ............. G10K 11/16 181/207 |
| 12,203,266 B2 * | 1/2025 | Wang .................... E04B 1/8209 |
| 2005/0150720 A1 * | 7/2005 | Tudor .................. G10K 11/162 181/204 |
| 2007/0071939 A1 | 3/2007 | Hueto |
| 2011/0124753 A1 * | 5/2011 | Baek .......................... C08J 9/32 521/131 |
| 2011/0257285 A1 | 10/2011 | Barriau et al. |
| 2011/0301255 A1 | 12/2011 | Barriau et al. |
| 2017/0221467 A1 * | 8/2017 | Vidovic .................... B32B 5/18 |

FOREIGN PATENT DOCUMENTS

| | | |
|---|---|---|
| EP | 2870906 A1 | 5/2015 |
| EP | 2957594 A1 | 12/2015 |
| WO | 03/054069 A1 | 7/2003 |
| WO | 2007/146726 A2 | 12/2007 |
| WO | 2010/002649 A1 | 1/2010 |
| WO | 2010/149354 A1 | 12/2010 |
| WO | 2020/059916 A1 | 3/2020 |
| WO | 2020/059917 A1 | 3/2020 |

OTHER PUBLICATIONS

Jan. 21, 2022 International Search Report issued in International Patent Application No. PCT/EP2021/080885.
Jan. 21, 2022 Written Opinion issued in International Patent Application No. PCT/EP2021/080885.

* cited by examiner

EXPANDABLE MATERIAL WITH IMPROVED THERMAL INSULATION PROPERTIES AND USE THEREOF

TECHNICAL FIELD

The present invention relates to thermally expandable composition and use thereof for providing acoustic damping and reinforcing elements having improved thermal insulation properties. The acoustic damping elements are especially suitable for damping of vibrations and noise of components and structures in manufactured articles, such as transportation vehicles and articles of home appliance and general industry.

BACKGROUND OF THE INVENTION

Damping materials are widely used in automotive, home appliance, and general industries for reducing undesired vibrations, structure borne noise, and air borne noise. For example, in automotive vehicles, it is desirable to prevent transfer of vibrations generated by the motors, pumps, gears and other dynamic force generators through the body of the vehicle into the passenger compartment. Structure borne noise is produced when the vibrations generated by a dynamic force generator are transmitted through a supporting structure, typically a frame or other hollow structure, to a noise emitting surface, such as a metallic or plastic panel, which transforms the mechanical vibrations into sound waves. Structure borne noise and vibrations in general can be effectively reduced by application of vibration damping materials directly to the structures and surfaces of components subjected to vibrational disturbances, such as to surfaces of vehicle panels, floors, and to shells of articles of home appliance and general industry, such as machines, washers, and dryers.

Damping materials used for damping of vibrating surfaces are commonly provided as pre-formed single- and multi-layer elements or as liquid compositions, which are applied directly on surface of a substrate. Pre-formed damping elements typically comprise a layer of damping material, which is in direct contact with a surface of the substrate to be damped against vibrational disturbances. The layer of damping material is capable of dissipating kinetic energy of the vibrating surface into heat energy through extension and compression of the material of the damping layer. Damping elements can further comprise an adhesive layer, such as a layer of a pressure sensitive adhesive or a hot-melt adhesive, to enable bonding of the damping element to a surface of a substrate. Liquid applied damping systems are typically thermally drying, gelling, or reactive compositions, which are applied on the surface of the substrate in liquid state, for example by spraying.

Commonly used damping materials include highly filled compositions comprising bitumen, elastomers, or thermoplastic polymers and varying amounts of additives, such as plasticizers, processing aids, rheology modifiers, and drying agents. Fillers are added to these compositions to meet different design goals. Some of the fillers are used to improve the acoustic damping properties, whereas other fillers are used to reduce the density of the material or to replace more expensive materials in order to reduce costs of raw materials. Typical fillers used in acoustic damping materials include, particularly, mineral fillers, such as calcium carbonate. Light weight mineral fillers, such as hollow ceramic spheres and hollow glass spheres have been widely used to reduce the density of the acoustic damping material and eventually to reduce the weight of the acoustic damping element.

The energy efficiency is one of the most important properties of modern dishwashers. Main portion of the energy consumed during operation of a dishwasher is used for heating and maintaining the temperature of the water that is used in washing cycles. Therefore, the main washing chamber, which is composed out of stainless-steel, must be well insulated with materials that can reduce the heat transfer. Secondly, vibrations and the "rain noise" impact resulting from water sprays hitting the walls of the stainless-steel tub of the dishwasher must be effectively damped.

State-of-the-Art solution is to cover the stainless-steel washing chamber with multiple bitumen-based damping pads to reduce the vibrations and provide certain thermal insulation. However, these materials have only limited heat insulation properties. Moreover, a high mass of the bitumen material is required to efficiently damp the vibrations, which means that the bitumen pads must be used in thick layers. The dishwasher production process contains heating steps, which are used to melt the bitumen pads to enable their adhesion onto the washing chamber. Heating a high mass of bitumen requires significant amounts of energy.

There is thus a need for a novel type of a damping element, which can be used for damping of vibrations and noises in a structure of a white good, such as in a dishwasher chamber, as well as to improve the energy efficiency of the white good.

SUMMARY OF THE INVENTION

The object of the present invention is to provide an improved composition for use in damping elements, which are suitable for damping of undesired vibrations and noise in structures and for improving the energy efficiency of manufactured articles, particularly of white goods, such as dishwashers.

The subject of the present invention is a thermally expandable composition as defined in claim 1.

It was surprisingly found out that a thermally expandable composition comprising a combination of a chemical and physical blowing agent can be used for providing damping elements having improved thermal insulation properties. It was also found out that such thermally expandable compositions have novel type of foam structure, which has an exceptionally low thermal conductivity.

One of the advantages of the thermally expandable material of the present invention is that the improvements in the foam structure can be obtained without increasing the material costs of the thermally expandable material.

Another advantage of the thermally expandable material of the present invention is that it can be combined with various types of materials without any further modifications to provide novel types of damping, baffling, and reinforcing elements with improved thermal insulation properties.

Other subjects of the present invention are presented in other independent claims. Preferred aspects of the invention are presented in the dependent claims.

DETAILED DESCRIPTION OF THE INVENTION

Figure 1:
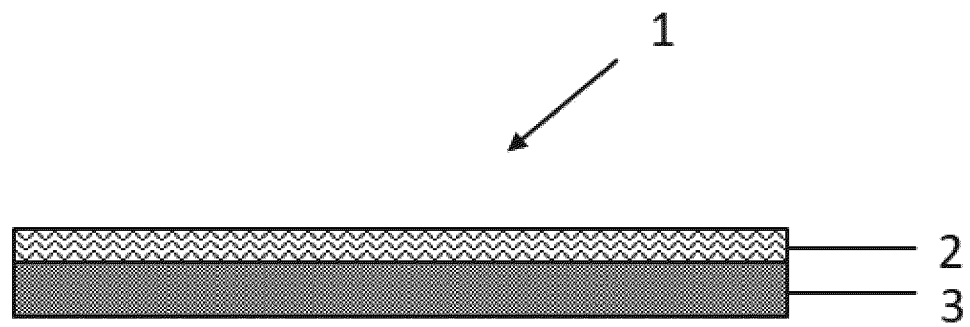
FIG. 1 shows a cross-section of a damping element (1) comprising a first layer (2) composed of an expansion material in its non-expanded state and second layer (3) composed of an acoustic damping material, wherein the first and second layers (2, 3) are directly connected to each other over their opposing major surfaces.

The subject of the present invention is a thermally expandable composition comprising:
- a1) At least one polymer P,
- a2) At least one chemical blowing agent CBA,
- a3) At least one physical blowing agent PBA, and
- a4) At least one filler F,
  wherein the at least one physical blowing agent PBA is composed of expandable microspheres.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "α-olefin" designates an alkene having the molecular formula $C_xH2_x$ (x corresponds to the number of carbon atoms), which features a carbon-carbon double bond at the first carbon atom (α-carbon). Examples of α-olefins include ethylene, propylene, 1-butene, 2-methyl-1-propene (isobutylene), 1-pentene, 1-hexene, 1-heptene and 1-octene. For example, neither 1,3-butadiene, nor 2-butene, nor styrene are referred as "α-olefins" according to the present disclosure.

The term "elastomer" designates any natural, synthetic, or modified high molecular weight polymer or combination of polymers, which is capable of recovering from large deformations, i.e. has elastic properties. Typical rubbers are capable of being elongated or deformed to at least 200% of their original dimension under an externally applied force, and will substantially resume the original dimensions, sustaining only small permanent set (typically no more than about 20%), after the external force is released. In particular, the term "elastomer" designates rubbers that have not been chemically crosslinked. The term "chemically crosslinked" is understood to mean that the polymer chains forming the compound are inter-connected by a plurality of covalent bonds, which are mechanically and thermally stable. The terms "rubber" and "elastomer" are used interchangeably in the present document.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight can be determined by conventional methods, preferably by gel permeation-chromatography (GPC) using polystyrene as standard, styrene-divinylbenzene gel with porosity of 100 Angstrom, 1000 Angstrom and 10000 Angstrom as the column, and, depending on the molecule, tetrahydrofurane as a solvent, at 35° C., or 1,2,4-trichlorobenzene as a solvent, at 160° C.

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The term "softening point" refers to a temperature at which compound softens in a rubber-like state, or a temperature at which the crystalline portion within the compound melts. The softening point is preferably determined by Ring and Ball measurement conducted according to DIN EN 1238:2011 standard.

The term "melting temperature" refers to a temperature at which a material undergoes transition from the solid to the liquid state. The melting temperature ($T_m$) is preferably determined by differential scanning calorimetry (DSC) according to ISO 11357-3:2018 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The "amount or content of at least one compound X" in a composition, for example "the amount of the at least one thermoplastic polymer TP" refers to the sum of the individual amounts of all thermoplastic polymers TP contained in the composition. For example, in case the composition comprises 20 wt.-% of at least one thermoplastic polymer TP, the sum of the amounts of all thermoplastic polymers TP contained in the composition equals 20 wt.-%.

The term "room temperature" designates a temperature of 23° C.

The thermally expandable composition comprises a combination of at least one chemical blowing agent CBA and at least one physical blowing agent PBA composed of expandable microspheres. Without being bound to any theory it is believed that the use of a combination of chemical and physical blowing agents results in formation of foam structure comprising larger and smaller cells, which are contained in the walls of the larger cells. Such foam structure has been found out to have an exceptionally low heat conductivity, which makes it especially suitable for use as a thermal insulation material.

Chemical blowing agents are organic or inorganic compounds that decompose under influence of, for example temperature or humidity, while at least one of the formed decomposition products is a gas. Commonly used chemical blowing agents include both exothermic and endothermic chemical blowing agents, such as azo compounds, hydrazides, nitroso compounds, carbamates, carbazides, bicarbonates, polycarboxylic acids, and salts of polycarboxylic acids.

Preferably, the at least one chemical blowing agent CBA has a maximum decomposition peak temperature measured by Differential Scanning Calorimetry (DSC) of at or below 250° C., more preferably at or below 225° C., even more preferably at or below 200° C., still more preferably at or below 185° C. The maximum decomposition peak measured by DSC can be determined by a DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min.

According to one or more embodiments, the at least one chemical blowing agent CBA has a maximum decomposition peak temperature measured by DSC in the range of 100-225° C., preferably 115-200° C., more preferably 125-185° C., even more preferably 135-175° C.

According to one or more embodiments, the at least one chemical blowing agent CBA comprises at least one exothermic chemical blowing agent, preferably selected from the group consisting of azodicarbonamide, azoisobutytronitrile, azocyclohexyl nitrile, dinitrosopentamethylene tetramine, azodiamino benzene, benzene-1,3-sulfonyl hydrazide, calcium azide, 4,4'-diphenyldisulphonyl azide, p-toluenesulphonyl hydrazide, p-toluenesulphonyl semicarbazide, 4,4'-oxybis(benzenesulphonylhydrazide), trihydrazino triazine, and N,N'-dimethyl-N,N'-dinitrosoterephthalamide.

According to one or more embodiments, the at least one chemical blowing agent CBA comprises two different exothermic chemical blowing agents, preferably selected from the group consisting of azodicarbonamide, azoisobutytronitrile, azocyclohexyl nitrile, dinitrosopentamethylene tetramine, azodiamino benzene, benzene-1,3-sulfonyl hydrazide, calcium azide, 4,4'-diphenyldisulphonyl azide, p-toluenesulphonyl hydrazide, p-toluenesulphonyl semicarbazide, 4,4'-oxybis(benzenesulphonylhydrazide), trihydrazino triazine, and N,N'-dimethyl-N,N'-dinitrosoterephthalamide.

According to one or more embodiments, the first exothermic chemical blowing agent comprises 45-95 wt.-%, preferably 50-85 wt.-%, more preferably 55-75 wt.-%, of the total weight of the at least one chemical blowing agent CBA and the second exothermic chemical blowing agent comprises 0.5-55 wt.-%, preferably 1.5-35 wt.-%, more preferably 2.5-15 wt.-%, of the total weight of the at least one chemical blowing agent CBA.

It may furthermore be advantageous to use an activator, accelerator, or catalyst in combination with the at least one exothermic chemical blowing agent. Examples of compounds suitable for this purpose include zinc compounds, such as zinc oxide, zinc acetate, zinc stearate, zinc bis(p-toluenesulphinate), or zinc bis(benzenesulphinate), titanium oxide, or magnesium oxide. Most preferred compounds are zinc compounds, especially zinc oxide, and mixtures of zinc compounds, especially mixtures of zinc oxide and zinc acetate.

According to one or more embodiments, the at least one chemical blowing agent CBA comprises 0.5-25 wt.-%, preferably 1.5-20 wt.-%, more preferably 2.5 and 15 wt.-%, based on the total weight of the at least one chemical blowing agent CBA, of an activator, preferably selected from the group consisting of zinc oxide, zinc acetate, and mixtures thereof.

According to one or more further embodiments, the at least one chemical blowing agent CBA comprises at least one endothermic chemical blowing agent, preferably selected from the group consisting of organic acids, metal hydrogen carbonates (bicarbonates), and metal carbonates.

Endothermic chemical blowing agents have the advantage that they are not hazardous or explosive, and that fewer volatile organic compounds (VOCs) are created during their decomposition. The decomposition products are essentially carbon dioxide and water.

Suitable organic acids to be used as the at least one endothermic chemical blowing agent include, for example, monocarboxylic acids, such as acetic acid and propionic acid, as well as solid polycarboxylic acids, for example solid, hydroxy-functionalized or unsaturated dicarboxylic, tricarboxylic, tetracarboxylic or polycarboxylic acids, such as citric acid, tartaric acid, malic acid, fumaric acid, and maleic acid. Partially esterified multifunctional organic acids having at least one free acidic functional group, in particular at least one free carboxylic group, are also suitable.

Suitable metal hydrogen carbonates (bicarbonate) and metal carbonates include those of formula $XHCO_3$ and $X_2CO_3$, wherein X stands for a generic cation, such as $Na^+$, $K^+$, $NH_4^+$, $½Zn^{2+}$, $½Mg^{2+}$, and $½Ca^{2+}$, in particular $Na^+$ and $K^+$.

According to one or more embodiments, the at least one endothermic chemical blowing agent is a multifunctional organic acid having at least two acidic functional groups, preferably at least two carboxylic groups, preferably having a molecular weight of not more than 1000 g/mol, preferably not more than 750 g/mol, more preferably not more than 500 g/mol, preferably selected from the group consisting of citric acid, tartaric acid, malic acid, fumaric acid, and maleic acid, preferably citric acid.

According to one or more embodiments, the at least one endothermic chemical blowing agent is a metal hydrogen carbonate or metal carbonate, preferably sodium hydrogen carbonate.

According to one or more embodiments, the at least one endothermic chemical blowing agent comprises a first endothermic chemical blowing agent, preferably a multifunctional organic acid having at least two acidic functional groups, preferably selected from the group consisting of citric acid, tartaric acid, malic acid, fumaric acid, and maleic acid, and a second endothermic chemical blowing agent, preferably a metal hydrogen carbonate or metal carbonate, preferably sodium hydrogen carbonate.

Preferably, the at least one physical blowing agent PBA is composed of expandable polymer microspheres. Suitable expandable polymer microspheres consist of a polymeric shell surrounding one or more pockets or particles of blowing agent or thermally expandable fluids or gases (propellant). Typically, the polymeric shell is composed of thermoplastic polymers, examples including ethyl methacrylate, acrylonitrile, methyl methacrylate, acrylonitrile, vinylidene chloride, o-chlorostyrene, p-tertiarybutyl styrene, and vinyl acetate and their copolymers, such as styrene-methacrylic acid, styrene-acrylonitrile, and styrene-methyl methacrylate. The polymeric shell may have reactive functional groups on its surface to give a fusible microsphere. Suitable propellants include low-boiling liquids or liquefied gases, such as hydrocarbons of the lower alkanes, for example isobutane or isopentane. When the expandable polymer microspheres are activated by heating, the outer polymer shell softens and at the same time, the liquid propellant inside the envelope changes into its gaseous state resulting an irreversible and three-dimensional expansion of the microsphere. The expansion is finished when the internal and external pressures equalize.

Suitable expandable polymer microspheres are commercially available, for example, under the trade name of Expancel® DU (from AkzoNobel) and under the trade name of Kureha® Microspheres (from Kureha Corporation).

These differ essentially by their unexpanded size (diameter in the unexpanded state) and their expansion starting temperature. Expandable polymer microspheres are also available as aqueous dispersions with a microsphere (solids) content of 35 to 55 wt.-%.

According to one or more embodiments, the expandable polymer microspheres have an unexpanded number average particle size (before expansion) in the range of 5-85 μm, preferably 10-65 μm, more preferably 15-55 μm, even more preferably 15-50 μm and/or an expanded number average particle size (after expansion) in the range of 35-300 μm, preferably 40-275 μm, more preferably 45-250 μm, even more preferably 50-200 μm. The term "particle size" refers in the present disclosure to the area-equivalent spherical diameter of a particle ($X_{area}$) and the term "number average particle size" refers to the arithmetic average of the individual sizes of the particles within a sample or collection or a statistically significant and representative random sample drawn from such a sample or collection.

According to one or more embodiments, the at least one physical blowing agent PBA comprises 0.1-10 wt.-%, preferably 0.5-7.5 wt.-%, more preferably 1-6.5 wt.-%, even more preferably 1.25-5.5 wt.-%, of the total weight of the thermally expandable composition. Thermally expandable compositions containing the at least one physical blowing agent PBA in an amount falling within the above cited ranges have been found out to exhibit an especially stable foam structure and low thermal conductivity in the expanded state of the composition.

According to one or more embodiments, the weight ratio of the amount at least one chemical blowing agent CBA to the amount of the at least physical blowing agent PBA is in the range of 5:1 to 1:5, preferably 3:1 to 1:3, more preferably 2:1 to 1:2, even more preferably 1.5:1 to 1:1.5, still more preferably 1:2:1 to 1:1,5, most preferably 1:1 to 1:1.3.

According to one or more embodiments, the sum of the amounts of the at least one chemical blowing agent CBA and the at least physical blowing agent PBA comprises 2.5-20 wt.-%, preferably 3.5-17.5 wt.-%, more preferably 4.5-15 wt.-%, even more preferably 5-15 wt.-%, still more preferably 5.5-12.5 wt.-%, most preferably 6-12 wt.-%, of the total weight of the thermally expandable composition.

Preferably, the at least one physical blowing agent PBA has an initiation expansion temperature of at or below 200° C., more preferably at or below 185° C., even more preferably at or below 175° C., still more preferably at or below 165° C. The initiation starting temperature of the at least on physical blowing agent can be determined using the method as described below.

According to one or more embodiments, the at least one physical blowing agent PBA has an initiation expansion temperature in the range of 75-185° C., preferably 85-175° C., more preferably 95-165° C., even more preferably 100-155° C.

Measurement of Initiation Expansion Temperature

A sample of a blowing agent having a volume of 2 cm³ is placed in an oven in a test tube. The temperature of the oven is increased at a constant rate until the volume of the sample has increased to a value corresponding to 1.1 times the initial volume of the sample. The temperature at which the 10% increase in volume is reached is recorded as the "initiation expansion temperature".

Preferably, the at least one physical blowing agent PBA has a maximum expansion temperature measured by DSC of at or below 275° C., more preferably at or below 250° C., even more preferably at or below 235° C., still more preferably at or below 225° C. According to one or more embodiments, the at least one physical blowing agent PBA has a maximum expansion temperature measured by DSC in the range of 145-250° C., preferably 155-235° C., more preferably 165-225° C., even more preferably 170-215° C.

The thermally expandable composition further comprises at least one polymer P.

The at least one polymer P is preferably a thermoplastic polymer. The term "thermoplastic" refers to any material which can be melted and re-solidified with little or no change in physical properties.

Preferably, the at least one polymer P comprises not more than 85 wt.-%, more preferably not more than 75 wt.-%, of the total weight of the thermally expandable composition. According to one or more embodiments, the at least one polymer P comprises 5-85 wt.-%, preferably 15-75 wt.-%, more preferably 20-70 wt.-%, even more preferably 25-65 wt.-%, of the total weight of the thermally expandable composition.

According to one or more embodiments, the thermally expandable composition is essentially free of epoxy resins having an average of more than one epoxy group per molecule. The expression "essentially free of epoxy resins having an average of more than one epoxy group per molecule" is understood to mean that the thermally expandable composition may contain only traces of epoxy resins having an average of more than one epoxy group per molecule, such as less than 0.25 wt.-%, preferably less than 0.1 wt.-%, more preferably less than 0.01 wt.-%, based on the total weight of the thermally expandable composition.

According to one or more embodiments, the at least one polymer P is selected from the group consisting of ethylene vinyl acetate copolymers, polyolefins, olefin (meth)acrylate copolymers, olefin alkyl (meth)acrylate copolymers, and olefin (meth)acrylic acid copolymers, preferably from the group consisting of ethylene vinyl acetate copolymers, olefin (meth)acrylate copolymers, olefin alkyl (meth)acrylate copolymers.

According to one or more embodiments, the at least one polymer P has a melting temperature ($T_m$) determined by differential scanning calorimetry (DSC) according to ISO 11357-3:2018 standard using a heating rate of 2° C./min of not more than 200° C., preferably not more than 175° C., even more preferably not more than 155° C., still more preferably not more than 135° C.

According to one or more embodiments, the at least one polymer P comprises at least one ethylene vinyl acetate copolymer P1. Generally, the expression "the at least one compound X comprises at least one compound XN", such as "the at least one polymer P comprises at least one ethylene vinyl acetate copolymer P1" is understood to mean in the context of the present disclosure that the composition comprises one or more ethylene vinyl acetate copolymers P1 as representatives of the at least one polymer P.

Suitable ethylene vinyl acetate copolymers include those having a content of a structural unit derived from vinyl acetate in the range of 4-90 wt.-%, preferably 15-80 wt.-%, based on the weight of the copolymer. Suitable copolymers of ethylene and vinyl acetate are commercially available, for example, under the trade name of Escorene® (from Exxon Mobil), under the trade name of Primeva® (from Repsol Quimica S.A.), and under the trade name of Evatane® (from Arkema Functional Polyolefins).

According to one or more embodiments, the at least one ethylene vinyl acetate copolymer P1 has:
  a melt flow index (MFI) determined according to ISO 1133 (190° C./2.16 kg) of at least 25 g/10 min, preferably at least 75 g/10 min, more preferably at least 125 g/10 min, even more preferably at least 150 g/10 min, still more preferably at least 175 g/10 min and/or a content of a structural unit derived from vinyl acetate in the range of 10-75 wt.-%, preferably 15-65 wt.-%, more preferably 18-55 wt.-%, based on the weight of the copolymer.

According to one or more embodiments, the at least one ethylene vinyl acetate copolymer P1 comprises 1.5-50 wt.-%, preferably 5-45 wt.-%, more preferably 10-40 wt.-%, even more preferably 15-35 wt.-%, of the total weight of the thermally expandable composition.

According to one or more embodiments, the at least one polymer P comprises at least one olefin alkyl (meth)acrylate copolymer P2.

According to one or more embodiments, the at least one olefin alkyl (meth)acrylate copolymer P2 comprises at least one first olefin alkyl (meth)acrylate copolymer P21 and at least one second olefin alkyl (meth)acrylate copolymer P22 different from at least one first olefin alkyl (meth)acrylate copolymer P21.

According to one or more embodiments, the at least one first olefin alkyl (meth)acrylate copolymer P21 has a melt flow index (MFI) determined according to ISO 1133 (190° C./2.16 kg) of not more than 100 g/10 min, preferably not more than 85 g/10 min, more preferably not more than 70 g/10 min and/or the at least one second olefin alkyl (meth) acrylate copolymer P22 has a melt flow index (MFI) determined according to ISO 1133 (190° C./2.16 kg) of at least 125 g/10 min, preferably at least 150 g/10 min, more preferably at least 175 g/10 min.

According to one or more embodiments, the at least one polymer P comprises, in addition or instead of the at least one olefin alkyl (meth)acrylate copolymer P2, at least one polyethylene P3.

Suitable polyethylenes include ethylene homopolymers and ethylene copolymers, preferably selected from the group consisting of low-density polyethylene (LDPE) or linear low-density polyethylene (LLDPE), or high-density polyethylene (HDPE), preferably linear low-density polyethylene (LLDPE).

According to one or more embodiments, the at least one polyethylene P3 has:

a melt flow index (MFI) determined according to ISO 1133 (190° C./2.16 kg) of at least 35 g/10 min, preferably at least 50 g/10 min, more preferably at least 75 g/10 min, even more preferably at least 100 g/10 min and/or a softening point determined according to ISO 306:2013 standard of at or below 150° C., preferably at or below 135° C., more preferably at or below 115° C.

The thermally expandable composition further comprises at least one filler F.

Suitable fillers to be used in the thermally expandable composition include, for example, ground or precipitated calcium carbonate, lime, calcium-magnesium carbonate, talcum, gypsum, graphite, barite, pyrogenic or precipitated silica, silicates, mica, wollastonite, kaolin, feldspar, chlorite, bentonite, montmorillonite, dolomite, quartz, cristobalite, calcium oxide, aluminum hydroxide, magnesium oxide, hollow ceramic spheres, hollow glass spheres, hollow organic spheres, glass spheres, functionalized alumoxanes, carbon black, and wood particles. Suitable fillers include both organically coated and also uncoated commercially available forms of the fillers included in the above presented list.

According to one or more embodiments, the at least one filler F comprises 1.5-75 wt.-%, preferably 5-70 wt.-%, more preferably 10-65 wt.-%, even more preferably 15-55 wt.-%, still more preferably 15-50 wt.-%, of the total weight of the thermally expandable composition.

According to one or more embodiments, the at least one filler F comprises at least one mineral filler MF, preferably having a median particle size $d_{50}$ of not more than 100 µm, more preferably not more than 50 µm, more preferably not more than 35 µm.

The term "median particle size $d_{50}$" refers to a particle size below which 50% of all particles by volume are smaller than the $d_{50}$ value. The particle size distribution can be measured by laser diffraction according to the method as described in standard ISO 13320:2009. For determination of the particle size distribution, the particles are preferably suspended in water (wet dispersion method). A Mastersizer 2000 device (trademark of Malvem Instruments Ltd, GB) can be used in measuring particle size distribution.

According to one or more embodiments, the at least one mineral filler FM has a median particle size $d_{50}$ in the range of 0.1-100 µm, preferably 0.25-75 µm, more preferably 0.35-50 µm, even more preferably 0.5-35 µm, still more preferably 0.5-25 µm, most preferably 0.5-15 µm.

It is also preferred that the at least one mineral filler FM is an inert mineral filler, preferably having a water-solubility of less than 0.1 g/100 g water, more preferably less than 0.05 g/100 g water, even more preferably less than 0.01 g/100 g water, at a temperature of 20° C. The solubility of a compound in water can be measured as the saturation concentration, where adding more compound does not increase the concentration of the solution, i.e. where the excess amount of the substance begins to precipitate. The term "inert mineral filler" refers in the present disclosure to fillers, which unlike mineral binders, are not reactive, i.e. do not undergo a hydration reaction in the presence of water.

According to one or more embodiments, the at least one mineral filler FM is selected from the group consisting of calcium carbonate, magnesium carbonate, talc, kaolin, diatomaceous earth, wollastonite, feldspar, montmorillonite, dolomite, silica, cristobalite, mica, barium sulfate, and graphite.

According to one or more embodiments, the at least one mineral filler FM comprises at least 1.5 wt.-%, preferably at least 5 wt.-%, more preferably at least 15 wt.-%, of the total weight of the at least one filler F.

According to one or more embodiments, the at least one filler F is composed of the at least one mineral filler FM.

According to one or more embodiments, the at least one filler F comprises at least one cellulose-containing filler FW, preferably containing at least 25 wt.-%, more preferably at least 35 wt.-%, even more preferably, at least 40 wt.-% of cellulose.

According to one or more embodiments, the at least one cellulose-containing filler FW is composed of wood particles. The term "wood particle" refers to particles composed of wood fibers. The length dimension of a wood particle is typically orientated parallel to the grain structure of the wood particle, i.e. parallel to the orientation of the long axis of the dominant fibers in the wood particle.

Suitable wood particles for use as the at least one cellulose-containing filler FW include, for example, all types of soft wood and hard wood particles.

The term "softwood" refers to wood from conifers, i.e. wood from needle-bearing trees from the order Pinales. Softwood-producing trees include, for example, pine, spruce, cedar, fir, larch, douglas-fir, hemlock, cypress, redwood, and yew. Conversely, the term "hardwood" refers to wood from broad-leaved or angiosperm trees, such as eucalyptus, maple, birch, beech, aspen, and the like. Softwoods contain two types of cells, longitudinal wood fibers (or tracheids) and transverse ray cells whereas hardwood trees contain pores or vessels. In softwood, water transport within the tree is via the tracheids rather than the pores of hardwoods.

According to one or more embodiments, the at least one cellulose-containing filler FW has:
a median particle size $d_{50}$ in the range of 50-650 µm, preferably 75-550 µm, more preferably 100-450 µm, even more preferably 125-400 µm, still more preferably 150-350 µm, most preferably 175-300 µm and/or
a $d_{90}$ particle size in the range of 150-1000 µm, preferably 175-750 µm, more preferably 200-550 µm, even more preferably 200-450 µm, most preferably 225-400 µm and/or
a $d_{10}$ particles size in the range of 15-350 µm, preferably 35-250 µm, more preferably 55-200 µm, even more preferably 65-175 µm, most preferably 85-150 µm.

The term $d_{90}$ particle width refers in the present disclosure to a particle width below which 90% of all particles by volume have a smaller width than the $d_{90}$ value. In analogy, the term "$d_{10}$ particle size" refers to a particle width below which 10% of all particles by volume have a smaller width than the $d_{10}$ value.

According to one or more embodiments, the at least one cellulose-containing filler FW has a true particle density in the range of 0.25-1.5 g/cm$^3$, preferably 0.30-1.25 g/cm$^3$, more preferably 0.35-1.0 g/cm$^3$, even more preferably 0.40-1.0 g/cm$^3$, still more preferably 0.45-0.85 g/cm$^3$, most preferably 0.50-0.75 g/cm$^3$. The term "true particle density" refers in the present disclosure to the real density of the particles that make up the particulate material. In contrast the term "bulk density" refers to the mass of the particulate material in a unit volume (including voids between particles).

According to one or more embodiments, the at least one solid particulate cellulose-containing filler FW has a true solid state density in the range of 1.00-2.00 g/cm$^3$, preferably 1.25-1.85 g/cm$^3$, more preferably 1.35-1.75 g/cm$^3$, even more preferably 1.40-1.70 g/cm$^3$, still more preferably 1.40-1.65 g/cm$^3$.

The term "true solid state density" refers to the "skeleton density" of a material calculated as a ratio of the mass of a particle to the volume occupied by the mass, wherein the contribution of the pores or internal voids is subtracted from the volume when calculating the true solid state density. The true solid state density of a particle is preferably determined by helium gas pycnometer measurements.

According to one or more embodiments, the at least one cellulose-containing filler FW comprises at least 1.5 wt.-%, preferably at least 5 wt.-%, more preferably at least 15 wt.-%, of the total weight of the at least one filler F.

According to one or more embodiments, the at least one filler F is composed of the at least one cellulose-containing filler FW.

According to one or more further embodiments, the at least one filler F comprises both the at least one mineral filler FM and the at least one cellulose-containing filler FW, wherein the at least one mineral filler FM preferably comprises 5-85 wt.-%, preferably 10-80 wt.-%, more preferably 25-75 wt.-%, even more preferably 35-65 wt.-%, of the total weight of the at least one filler F and/or the at least one cellulose-containing filler FW comprises 5-85 wt.-%, preferably 10-80 wt.-%, more preferably 25-75 wt.-%, even more preferably 35-65 wt.-%, of the total weight of the at least one filler F.

According to one or more embodiments, the thermally expandable composition further comprises:
a5) At least one tackifying resin TR.

The term "tackifying resin" designates in the present disclosure resins that in general enhance the adhesion and/or tackiness of a composition. The term "tackiness" refers in the present document to the property of a substance of being sticky or adhesive by simple contact, which can be measured, for example, as a loop tack. Preferred tackifying resins are tackifying at a temperature of 25° C.

Suitable tackifying resins to be used in the thermally expandable composition have a relatively low number average molecular weight ($M_n$), such as not more than 5000 g/mol, in particular not more than 3500 g/mol, preferably not more than 2500 g/mol and a softening point ($T_s$), determined by a Ring and Ball method according to DIN EN 1238:2011, of at or below 175° C., preferably at or below 165° C., more preferably at or below 155° C. Suitable tackifying resins include, in particular, synthetic resins, natural resins, and chemically modified natural resins.

The term "synthetic resin" designates in the present disclosure compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Suitable aliphatic monomers may include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Examples of aromatic monomer include $C_8$, $C_9$, and $C_{10}$ aromatic monomers. Typical aromatic monomers include, styrene, alphamethyl styrene, vinyl toluene, methoxy styrene, tertiary butyl styrene, chlorostyrene, coumarone, and indene monomers including indene, and methyl indene, and combinations thereof.

Suitable synthetic resins include, for example, hydrocarbon resins, coumarone-indene resins, polyindene resins, polystyrene resins, vinyl toluene-alphamethyl styrene copolymer resins, and alphamethyl styrene resins.

The term "hydrocarbon resin" designates in the present disclosure synthetic resins made by polymerizing mixtures of unsaturated monomers obtained from petroleum-based feedstocks, such as by-products of cracking of natural gas liquids, gas oil, or petroleum naphthas. These types of hydrocarbon resins are also known as "petroleum resins" or as "petroleum hydrocarbon resins". The hydrocarbon resins include also pure monomer aromatic resins, which are prepared by polymerizing aromatic monomer feedstocks that have been purified to eliminate color causing contaminants and to precisely control the composition of the product.

Suitable hydrocarbon resins are commercially available, for example, under the trade name of Wingtack®, Wingtack® Plus, Wingtack® Extra, and Wingtack® STS (all from Cray Valley); under the trade name of Escorez® 1000 series, Escorez® 2000 series, and Escorez® 5000 series (all from ExxonMobil Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

According to one or more embodiments, the at least one tackifying resin TR comprises 0.1-30 wt.-%, preferably 1.5-25 wt.-%, more preferably 5-20 wt.-%, of the total weight of the thermally expandable composition.

According to one or more embodiments, the thermally expandable composition further comprises:
- a6) At least one adhesion promoter AP having glycidyl (meth)acrylate groups.

Suitable adhesion promoters include, for example, olefin glycidyl (meth)acrylate copolymers, olefin alkyl (meth)acrylate glycidyl (meth)acrylate terpolymers, and glycidyl methacrylate grafted (co)polymers. The term "(meth)acrylate" designates in the present disclosure both acrylate and methacrylate.

Suitable olefin glycidyl (meth)acrylate copolymers to be used as the at least one adhesion promoter AP include, for example, copolymers of ethylene, propylene, or butylene with glycidyl acrylate (GA) or with glycidyl (meth)acrylate (GMA).

Suitable olefin alkyl (meth)acrylate glycidyl (meth)acrylate terpolymers to be used as the at least one adhesion promoter AP include, for example, terpolymers, in particular random terpolymers, of ethylene and alkyl (meth)acrylate with glycidyl acrylate (GA) or with glycidyl methacrylate (GMA), wherein the alkyl group of the alkyl (meth)acrylate is preferably selected from the group consisting of methylene, ethylene, propylene, and butylene, in particular methylene or butylene.

Preferred olefin alkyl (meth)acrylate glycidyl (meth)acrylate terpolymers include ethylene methyl acrylate glycidyl acrylate terpolymers (E/MA/GA), ethylene ethyl acrylate glycidyl acrylate terpolymers (E/EA/GA), ethylene propyl acrylate glycidyl acrylate terpolymers (E/PA/GA), ethylene butyl acrylate glycidyl acrylate terpolymers (E/BA/GA), ethylene methyl methacrylate glycidyl acrylate terpolymers (E/MMA/GA), ethylene ethyl methacrylate glycidyl acrylate terpolymers (E/EMA/GA), ethylene propyl methacrylate glycidyl acrylate terpolymers (E/PMA/GA), ethylene butyl methacrylate glycidyl acrylate terpolymers (E/BMA/GA), ethylene methyl acrylate glycidyl methacrylate terpolymers (E/MA/GMA), ethylene ethyl acrylate glycidyl methacrylate terpolymers (E/EA/GMA), ethylene propyl acrylate glycidyl methacrylate terpolymers (E/PA/GMA), ethylene butyl acrylate glycidyl methacrylate terpolymers (E/BA/GMA), ethylene methyl methacrylate glycidyl methacrylate terpolymers (E/MMA/GMA), ethylene ethyl methacrylate glycidyl methacrylate terpolymers (E/EMA/GMA), ethylene propyl methacrylate glycidyl methacrylate terpolymers (E/PMA/GMA), ethylene butyl methacrylate glycidyl methacrylate terpolymers (E/BMA/GMA).

Suitable glycidyl (meth)acrylate grafted (co)polymers to be used as the at least one adhesion promoter AP include, for example, glycidyl methacrylate grafted olefin vinyl acetate copolymers, glycidyl methacrylate grafted ethylene-α-olefin copolymers, glycidyl methacrylate grafted propylene-α-olefin copolymers, glycidyl methacrylate grafted polyethylene, glycidyl methacrylate grafted polypropylene, and glycidyl methacrylate grafted olefin copolymer elastomers, glycidyl (meth)acrylate grafted styrene butadiene copolymers, and glycidyl (meth)acrylate grafted styrene ethylene butylene styrene terpolymers.

According to one or more embodiments, the at least one adhesion promoter AP comprises at least one olefin alkyl acrylate glycidyl (meth)acrylate terpolymer API, preferably selected from the group consisting of random terpolymers of ethylene, alkyl (meth)acrylate, and glycidyl methacrylate, wherein the alkyl group of the alkyl (meth)acrylate is preferably selected from the group consisting of methylene, ethylene, propylene, and butylene, in particular methylene or butylene.

According to one or more embodiments, the at least one olefin alkyl acrylate glycidyl (meth)acrylate terpolymer AP has:
- a content of glycidyl methacrylate of 1-50 wt.-%, more preferably 2-25 wt.-%, even more preferably 5-15 wt.-% and/or
- a melt flow index, determined according to ISO 1133 (190° C./2.16 kg), of not more than 100 g/10 min, preferably not more than 75 g/10 min, more preferably not more than 50 g/10 min and/or
- a melting temperature ($T_m$) as determined by DSC measurements conducted according to ISO 11357-3:2018 of at or below 150° C., preferably at or below 135° C., more preferably at or below 100° C.

According to one or more embodiments, at least one adhesion promoter AP having glycidyl (meth)acrylate groups comprises 0.1-20 wt.-%, preferably 0.25-10 wt.-%, more preferably 0.5-7 wt.-%, of the total weight of the thermally expandable composition.

According to one or more embodiments, the thermally expandable composition is essentially free of organic peroxides, preferably essentially free of peroxides.

The expression "essentially free of peroxides" is understood to mean that the thermally expandable composition may contain only traces of peroxides, such as less than 0.25 wt.-%, preferably less than 0.1 wt.-%, more preferably less than 0.01 wt.-%, based on the total weight of the thermally expandable composition.

According to one or more further embodiments, the thermally expandable composition is essentially free of free-radical cross-linkers. The expression "essentially free of free-radical cross-linkers" is understood to mean that the amount of such substances, which are able to cross-link polymers by free-radical curing mechanism is preferably less than 0.25 wt.-%, more preferably less than 0.1 wt.-%, even more preferably less than 0.05 wt.-%, based on the total weight of the thermally expandable composition.

Another subject of the present invention is a damping element comprising a first layer composed of an expansion material and a second layer composed of an acoustic damping material, wherein the expansion material has an expansion rate of at least 100%, preferably at least 250%, more preferably at least 350%, even more preferably at least 500% and wherein the acoustic damping material comprises:
- b1) A bitumen component BC or a polymer component PC,
- b2) At least one hydrocarbon resin HR,
- b3) Optionally at least one wax W, and
- b4) Optionally at least one plasticizer PL, and
- b5) At least 25 wt.-%, preferably at least 35 wt.-%, based on the total weight of the acoustic damping material, of at least one solid particulate filler PF.

The damping element of the present invention is especially suitable for use in damping of undesired vibrations and noise in mechanical structures and components of manufactured articles, such as transportation vehicles or products of home appliance or general industry.

A cross-section of a damping element according to the present invention is shown in FIG. 1.

The term "layer" refers in the present disclosure to a sheet-like element having first and second major surfaces, i.e. top and bottom surfaces, a width defined between longitudinally extending edges, and a thickness defined between the first and second major surfaces. The term "thickness" refers to a dimension of a sheet-like element that is measured in a plane that is substantially perpendicular to the length and width dimensions of the element. Preferably, a sheet-like element has a length and width at least 5 times, preferably at least times, more preferably at least 15 times greater than the thickness of the element.

The term "expansion rate" refers in the present disclosure to the relative density decrease $\delta_0/\delta_{exp} \cdot 100\%$, wherein $\delta_{exp}$ is the density of the material in an expanded state and $\delta_0$ is the density of the material in original non-expanded state. The densities of the material can be determined based on measurements conducted according to DIN EN ISO 1183-1:2019 standard (Archimedes principle) in deionized water in combination with sample mass determined by a precision balance.

According to one or more embodiments, the expansion material has an expansion rate of at least 100%, preferably at least 250%, wherein the expansion rate is determined as relative density decrease $\delta_0/\delta_{exp} \cdot 100\%$, wherein $\delta_{exp}$ is the density of the material in an expanded state and $\delta_0$ is the density of the material in original non-expanded state, wherein densities of the expansion material are determined based on measurements conducted according to DIN EN ISO 1183-1:2019 standard in deionized water in combination with sample mass determined by a precision balance.

Preferably, the expansion material in its non-expanded state is thermally activatable, i.e., the expansion of the expansion material is triggered by heating. This means that the expansion material in its non-expanded state can be activated by a heating to a temperature that exceeds its activation temperature and by keeping the material at the elevated temperature for long enough until the material has expanded into its intended final (sufficiently expanded and stable) state.

The optimal temperature and duration of the heating step (dwell time) depends on the embodiment of the damping element, particularly on the composition of the expansion material. According to one or more embodiments, the expansion material has an activation temperature in the range of 85-225° C., preferably 95-200° C., more preferably 105-185° C. and/or a dwell time of the heating step in the range of 1-90 min, preferably 3-60 min, more preferably 5-30 min.

According to one or more embodiments, the first layer has a thickness in the range of 0.05-5 mm, preferably 0.1-3.5 mm, when the expansion material is in its non-expanded state.

According to one or more embodiments, the first layer has a thickness in the range of 0.5-15 mm, preferably 1.5-10 mm, when the expansion material is in its expanded state.

Preferably, the first and second layers of the damping element are directly connected to each other over at least part of their opposing major surfaces. The expression "directly connected" is understood to mean in the context of the present invention that no further layer or substance is present between the respective layers, and that the opposing surfaces of the two layers are directly bonded to each other or adhere to each other. At the transition area between the two layers, the materials forming the layers can also be present mixed with each other.

According to one or more embodiments, the first major surface of the first layer forms one of the primary exterior surfaces of the damping element. The term "primary exterior surface" refers here to the outermost surfaces of the damping element.

Preferably, the first layer of the damping element is a continuous layer of a solid material, i.e. the first layer does not include voids or holes extending between the outer surfaces of the first layer.

According to one or more embodiments, the damping element further comprises a polymeric coating covering at least a portion the second major surface of the second layer. The polymeric coating is preferably not tacky to touch at temperatures of 23° C. and below. The term "tacky" refers in the present disclosure to a surface tack in the sense of instantaneous adhesion or stickiness that is preferably sufficient so that, when pressed with a thumb, exerting a pressure of 5 kg for 1 second on the surface of the composition, the thumb remains sticking to the surface of the composition, preferably such that a composition having an intrinsic weight of 50 g can be lifted up for at least 5 seconds.

Suitable materials for the polymeric coating include acrylic polymers, ethylene-vinyl acetate copolymers, ethylene α-olefin copolymers, propylene α-olefin copolymers, polyethylene, polypropylene, polyvinylchloride, polyethylene terephthalate, polystyrene, styrene copolymers, polyurethanes, polyvinyl alcohol, polyvinyl acetate, silicones, polyamides, and chlorosulfonated polyethylene (CSPE).

According to one or more embodiments, the polymeric coating comprises at least 5 wt.-%, preferably at least 15 wt.-%, more preferably at least 35 wt.-%, based on the total weight of the polymeric coating, of at least one acrylic polymer. The term "acrylic polymer" refers in the present document to homopolymers, copolymers and higher interpolymers of an acrylic monomer with one or more further acrylic monomers and/or with one or more other ethylenically unsaturated monomer(s). The term "acrylic monomer" refers in the present document to (meth)acrylates, (meth)acrylic acid, and to derivatives thereof, for example, amides of (meth)acrylic acid or nitriles of (meth)acrylic acid. Preferred acrylic polymers contain at least 30 wt.-%, more preferably at least 40 wt.-%, even more preferably at least 50 wt.-%, of acrylic monomers.

According to one or more embodiments, the polymeric coating has mass per unit weight of not more than 150 g/m², preferably not more than 100 g/m², such as in the range of 5-125 g/m², preferably 10-100 g/m², more preferably 15-85 g/m².

Preferably, the expansion material comprises at least one polymer, preferably selected from the group consisting of ethylene vinyl acetate copolymers, polyolefins, olefin (meth)acrylate copolymers, olefin alkyl (meth)acrylate copolymers, and olefin (meth)acrylic acid copolymers.

Preferably, the at least one polymer comprises not more than 85 wt.-%, more preferably not more than 75 wt.-%, of the total weight of the expansion material. According to one or more embodiments, the at least one polymer comprises 5-85 wt.-%, preferably 15-75 wt.-%, more preferably 20-70 wt.-%, even more preferably 25-65 wt.-%, of the total weight of the expansion material.

According to one or more embodiments, the at least one polymer comprises at least one ethylene vinyl acetate copolymer, preferably having:
  a melt flow index (MFI) determined according to ISO 1133 (190° C./2.16 kg) of at least 25 g/10 min, preferably at least 75 g/10 min, more preferably at least 125 g/10 min, even more preferably at least 150 g/10 min, still more preferably at least 175 g/10 min and/or
  a content of a structural unit derived from vinyl acetate in the range of 10-75 wt.-%, preferably 15-65 wt.-%, more preferably 18-55 wt.-%, based on the weight of the copolymer.

According to one or more embodiments, the at least one ethylene vinyl acetate copolymer comprises 1.5-50 wt.-%, preferably 5-45 wt.-%, more preferably 10-40 wt.-%, even more preferably 15-35 wt.-%, of the total weight of the expansion material.

According to one or more embodiments, the expansion material further comprises at least one filler, preferably selected from the group consisting of ground or precipitated calcium carbonate, lime, calcium-magnesium carbonate, talcum, gypsum, graphite, barite, pyrogenic or precipitated silica, silicates, mica, wollastonite, kaolin, feldspar, chlorite, bentonite, montmorillonite, dolomite, quartz, cristobalite, calcium oxide, aluminum hydroxide, magnesium oxide, hollow ceramic spheres, hollow glass spheres, hollow organic spheres, glass spheres, functionalized alumoxanes, carbon black, and wood particles.

According to one or more embodiments, the at least one filler has a median particle size $d_{50}$ in the range of 0.1-100 µm, preferably 0.25-75 µm, more preferably 0.35-50 µm, even more preferably 0.5-35 µm, still more preferably 0.5-25 µm, most preferably 0.5-10 µm.

Preferably, the at least one filler as a water-solubility of less than 0.1 g/100 g water, more preferably less than 0.05 g/100 g water, even more preferably less than 0.01 g/100 g water, at a temperature of 20° C. The solubility of a compound in water can be measured as the saturation concentration, where adding more compound does not increase the concentration of the solution, i.e. where the excess amount of the substance begins to precipitate.

According to one or more embodiments, the at least one filler is selected from the group consisting of calcium carbonate, magnesium carbonate, talc, kaolin, diatomaceous earth, wollastonite, feldspar, montmorillonite, dolomite, silica, cristobalite, mica, barium sulfate, and graphite.

According to one or more embodiments, the at least one filler comprises 1.5-75 wt.-%, preferably 5-70 wt.-%, more preferably 10-65 wt.-%, even more preferably 15-55 wt.-%, still more preferably 15-50 wt.-%, of the total weight of the expansion material.

Preferably, the expansion material comprises in its non-expanded state at least one chemical foaming agent and/or at least one physical foaming agent.

According to one or more embodiments, the expansion material comprises in its non-expanded state at least one physical foaming agent, preferably composed of expandable polymer microspheres.

According to one or more embodiments, the expandable polymer microspheres have an unexpanded (before expansion) number average particle size (before expansion) in the range of 5-85 µm, preferably 10-65 µm, more preferably 15-55 µm, even more preferably 15-50 µm and/or an expanded number average particle size (after expansion) in the range of 35-300 µm, preferably 40-275 µm, more preferably 45-250 µm, even more preferably 50-200 µm.

Preferably, the at least one physical foaming agent has an initiation expansion temperature of at or below 200° C., more preferably at or below 185° C., even more preferably at or below 175° C., still more preferably at or below 165° C.

According to one or more embodiments, the at least one physical foaming agent has an initiation expansion temperature in the range of 75-185° C., preferably 85-175° C., more preferably 95-165° C., even more preferably 100-155° C.

According to one or more embodiments, the at least one physical foaming agent comprises 0.1-10 wt.-%, preferably 0.5-7.5 wt.-%, more preferably 1-6.5 wt.-%, even more preferably 1.25-5.5 wt.-%, of the total weight of the expansion material in its non-expanded state.

According to one or more embodiments, the expansion material comprises, in addition or instead of the at least one physical foaming agent, at least one chemical foaming agent.

Preferably, the at least one chemical foaming agent has a maximum decomposition peak temperature measured by Differential Scanning Calorimetry (DSC) of at or below 250° C., more preferably at or below 225° C., even more preferably at or below 200° C., still more preferably at or below 185° C. The maximum decomposition peak measured by DSC can be determined by a DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min.

According to one or more embodiments, the at least one chemical foaming agent has a maximum decomposition peak temperature measured by DSC in the range of 100-225° C., preferably 115-200° C., more preferably 125-185° C., even more preferably 135-175° C.

According to one or more embodiments, the at least one chemical foaming agent comprises at least one exothermic chemical foaming agent, preferably selected from the group consisting of azodicarbonamide, azoisobutytronitrile, azo-cyclohexyl nitrile, dinitrosopentamethylene tetramine, azo-diamino benzene, benzene-1,3-sulfonyl hydrazide, calcium azide, 4,4'-diphenyldisulphonyl azide, p-toluenesulphonyl hydrazide, p-toluenesulphonyl semicarbazide, 4,4'-oxybis (benzenesulphonylhydrazide), trihydrazino triazine, and N,N'-dimethyl-N,N'-dinitrosoterephthalamide.

According to one or more further embodiments, the at least one chemical foaming agent comprises at least one endothermic chemical foaming agent, preferably selected from the group consisting of organic acids, metal hydrogen carbonates (bicarbonates), and metal carbonates.

Suitable organic acids to be used as the at least one endothermic chemical foaming agent include, for example, monocarboxylic acids, such as acetic acid and propionic acid, as well as solid polycarboxylic acids, for example solid, hydroxy-functionalized or unsaturated dicarboxylic, tricarboxylic, tetracarboxylic or polycarboxylic acids, such as citric acid, tartaric acid, malic acid, fumaric acid, and maleic acid. Partially esterified multifunctional organic acids having at least one free acidic functional group, in particular at least one free carboxylic group, are also suitable Suitable metal hydrogen carbonates (bicarbonate) and metal carbonates to be used as the at least one endothermic chemical foaming agent include those of formula $XHCO_3$ or $X_2CO_3$, wherein X stands for a generic cation, such as $Na^+$, $K^+$, $NH_4^+$, $\frac{1}{2}Zn^{2+}$, $\frac{1}{2}Mg^{2+}$, and $\frac{1}{2}Ca^{2+}$, in particular $Na^+$ and $K^+$.

According to one or more embodiments, the at least one endothermic chemical foaming agent is a multifunctional organic acid having at least two acidic functional groups, preferably at least two carboxylic groups, preferably having a molecular weight of not more than 1000 g/mol, preferably not more than 750 g/mol, more preferably not more than 500 g/mol, preferably selected from the group consisting of citric acid, tartaric acid, malic acid, fumaric acid, and maleic acid, preferably citric acid.

According to one or more embodiments, the at least one endothermic chemical foaming agent is a metal hydrogen carbonate or metal carbonate, preferably sodium hydrogen carbonate.

According to one or more embodiments, the at least one endothermic chemical foaming agent comprises a first endothermic chemical foaming agent, preferably a multifunctional organic acid having at least two acidic functional groups, preferably selected from the group consisting of citric acid, tartaric acid, malic acid, fumaric acid, and maleic acid and a second endothermic chemical foaming agent, preferably a metal hydrogen carbonate or metal carbonate, preferably sodium hydrogen carbonate.

According to one or more embodiments, the at least one chemical foaming agent comprises 0.1-15 wt.-%, preferably 0.5-12.5 wt.-%, more preferably 1-10 wt.-%, even more preferably 2.5-8.5 wt.-%, of the total weight of the expansion material in its non-expanded state.

According to one or more embodiments, the expansion material comprises in its non-expanded state both the at least one physical foaming agent and the at least one chemical foaming agent, wherein the sum of the amounts of the at least one physical foaming agent and the at least one chemical foaming agent comprises 2.5-20 wt.-%, preferably 3.5-17.5 wt.-%, more preferably 4.5-15 wt.-%, even more preferably 5.5-12.5 wt.-%, of the total weight of the expansion material in its non-expanded state.

According to one or more preferred embodiments, the expansion material is composed of the thermally expandable composition of the present invention in its non-expanded or expanded state.

The second layer of the damping element of the present invention is composed of an acoustic damping material.

The bitumen component BC, the polymer component PC and the various additives including the at least one hydrocarbon resin HR, the at least one wax H, and the at least one plasticizer PL, if present in the acoustic damping material, form a binder matrix for the at least one solid particulate filler PF. The amount of the binder matrix in the acoustic damping material is not particularly restricted but its amount should be high enough to enable efficient binding of the constituents of the filler component and to prevent formation of interconnected solid networks of the solid particulate compounds.

The at least one solid particulate filler PF comprises at least 25 wt.-%, preferably at least 35 wt.-%, more preferably at least 45 wt.-%, of the total weight of the acoustic damping material. According to one or more embodiments, the at least one solid particulate filler PF comprises 25-75 wt.-%, preferably 35-70 wt.-%, more preferably 40-70 wt.-%, even more preferably 45-70 wt.-%, still more preferably 45-65 wt.-%, of the total weight of the acoustic damping material.

According to one or more embodiments, the sum of the amounts of constituents b1) to b4), i.e. the sum of the amounts of the bitumen component BC, the polymer component PC, the at least one hydrocarbon resin HR, the at least one wax W, and the at least one plasticizer PL, if present in the acoustic damping material, comprises not more than 70 wt.-%, preferably not more than 65 wt.-%, more preferably not more than 60 wt.-% of the total weight of the acoustic damping material. According to one or more embodiments, the sum of the amounts of constituents b1) to b4) comprises 15-65 wt.-%, preferably 20-60 wt.-%, more preferably 20-55 wt.-%, even more preferably 25-50, most preferably 25-45 wt.-%, of the total weight of the acoustic damping material.

The at least one solid particulate filler PF preferably has a $d_{90}$ particle size of not more than 2.5 mm, more preferably not more than 1.5 mm and/or a water-solubility of less than 0.1 g/100 g water, more preferably less than 0.05 g/100 g water, even more preferably less than 0.01 g/100 g water, at a temperature of 20° C.

According to one or more embodiments, the at least one solid particulate filler PF is selected from the group consisting of calcium carbonate, magnesium carbonate, talc, kaolin, diatomaceous earth, wollastonite, feldspar, montmorillonite, dolomite, silica, cristobalite, iron oxide, iron nickel oxide, strontium ferrite, barium-strontium ferrite, hollow ceramic spheres, hollow glass spheres, hollow organic spheres, glass spheres, mica, barium sulfate, and graphite.

It may be preferable that the acoustic damping material comprises several different fillers, such as at least two different fillers. Some of the fillers may, for example, be used for improving the acoustic damping properties of the acoustic damping material whereas other may be used to enable adhering of the acoustic damping material to a metal substrate by magnetic force or for decreasing the weight of the acoustic damping material. According to one or more embodiments, the at least one solid particulate filler PF comprises:

b51) At least one first solid particulate filler PF1 and/or
b52) At least one second solid particulate filler PF2 different from the at least one first solid particulate filler PF1, and/or
b53) At least one third solid particulate filler PF3 different from the at least one first solid particulate filler PF1 and from the at least one second solid particulate filler PF2.

According to one or more embodiments, the at least one first solid particulate filler PF1 has a median particle size $d_{50}$ in the range of 1-100 µm and/or a true particle density of at least 1.5 g/cm³ and/or a number average particle aspect ratio of not more than 2.5.

The term "aspect ratio" refers in the present disclosure to the value obtained by dividing the length of a particle by the thickness of the particle. The "length of a particle" refers in the present disclosure to the maximum Feret diameter ($X_{Fe,max}$), i.e. the longest Feret diameter out of the measured set of Feret diameters. The term "Feret diameter" refers in the present disclosure to the distance between two tangents on opposite sides of the particle, parallel to some fixed direction and perpendicular to the measurement direction. The "thickness of a particle" refers in the present disclosure to the minimum Feret diameter ($X_{Fe,min}$), i.e. the shortest Feret diameter out of the measured set of Feret diameters. The aspect ratio is, therefore, calculated as the ratio of $X_{Fe,max}$ and $X_{Fe,min}$.

The aspect ratio of a particle can be determined by measuring the length and thickness of the particle using any suitable measurement technique, preferably by using dynamic image analysis method conducted according to ISO 13322-2:2006 standard and calculating the aspect ratio from the measured dimensions of the particle as described above. The dimensions of particles can be measured with a dry dispersion method, where the particles are dispersed in air, preferably by using air pressure dispersion method. The measurements can be conducted using any type of dynamic image analysis apparatus, such as a Camsizer XT device (trademark of Retsch Technology GmbH).

The term "number average aspect ratio" refers in the present disclosure to the arithmetic average of the individual aspect ratios of the particles within a sample or collection or a statistically significant and representative random sample drawn from such a sample or collection. The number average aspect ratio of a particulate material can be determined by measuring the dimensions of individual particles of the sample using any suitable measurement technique, preferably by using dynamic image analysis method conducted according to ISO 13322-2:2006 standard, and calculating the number average aspect ratio from the measured dimensions of the individual particles as described above.

According to one or more embodiments, the at least one second solid particulate filler PF2 has a median particle size $d_{50}$ in the range of 250-1000 μm and/or a true particle density of not more than 1.0 g/cm³.

According to one or more embodiments, the at least one third solid particulate filler PF3 has a median particle size $d_{50}$ of at least 100 μm and/or a true particle density of at least 1.5 g/cm³ and/or a number average particle aspect ratio of at least 3.0.

According to one or more embodiments, the at least one first solid particulate filler PF1 is selected from the group consisting of calcium carbonate, magnesium carbonate, talc, kaolin, wollastonite, feldspar, montmorillonite, dolomite, silica, cristobalite, iron oxide, iron nickel oxide, strontium ferrite, and synthetic organic fillers.

According to one or more embodiments, the at least one second solid particulate filler PF2 is selected from the group consisting of hollow ceramic spheres, hollow glass spheres, hollow organic spheres, and glass spheres, According to one or more embodiments, the at least one third solid particulate filler PF3 is selected from the group consisting of mica, montmorillonite, slate, talc, barium sulfate, and graphite.

The acoustic damping material further comprises at least one hydrocarbon resin HR.

Examples of suitable hydrocarbon resins to be used as the at least one hydrocarbon resin HR include C5 aliphatic resins, mixed C5/C9 aliphatic/aromatic resins, aromatic modified C5 aliphatic resins, cycloaliphatic resins, mixed C5 aliphatic/cycloaliphatic resins, mixed C9 aromatic/cycloaliphatic resins, mixed C5 aliphatic/cycloaliphatic/C9 aromatic resins, aromatic modified cycloaliphatic resins, C9 aromatic resins, as well hydrogenated versions of the aforementioned resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

The type of the at least one hydrocarbon resin HR is not particularly restricted in the present invention. The selection of the at least one hydrocarbon resin HR depends, at least partially, on the type of the other components contained in the binder matrix of the acoustic damping material, in particular of the type of the polymer component PC.

According to one or more embodiments, the at least one hydrocarbon resin HR has:
 a softening point determined by using the Ring and Ball method as defined in DIN EN 1238:2011 standard of at least 70° C., preferably at least 80° C., more preferably in the range of 70-180° C., preferably 80-170° C., more preferably 100-160° C. and/or
 an average molecular weight ($M_n$) in the range of 250-7500 g/mol, preferably 300-5000 g/mol and/or
 a glass transition temperature ($T_g$) determined by dynamical mechanical analysis (DMA) as the peak of the measured loss modulus (G") curve using an applied frequency of 1 Hz and a strain level of 0.1% of at or above 0° C., preferably at or above 15° C., more preferably at or above 35° C., even more preferably at or above 55° C., still more preferably at or above 65° C., most preferably at or above 75° C.

Suitable hydrocarbon resins are commercially available, for example, under the trade name of Wingtack® series, Wingtack® Plus, Wingtack® Extra, and Wingtack® STS (all from Cray Valley); under the trade name of Escorez® 1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

According to one or more embodiments, the acoustic damping material further comprises at least one wax W.

The term "wax" designates in the present document substances that have a waxy consistency and have a melting temperature or melting temperature range of above normal room temperature, in particular above 25° C.

Suitable waxes to be used as the at least one wax include in particular synthetic waxes, for example, petroleum waxes, such as paraffin wax, petrolatum, and microcrystalline waxes, polyolefin waxes, polyethylene glycol waxes (Carbowax), amide waxes, and chemically modified waxes, such as hardened or hydrogenated waxes, for example, Montan ester waxes.

According to one more embodiments, the at least one wax W is selected from the group consisting of polyolefin waxes, paraffin waxes, microcrystalline waxes, and amide waxes.

According to one or more embodiments, the at least one wax W has:
 a softening point determined by using the Ring and Ball method as defined in DIN EN 1238:2011 standard in the range of 75-180° C., preferably 80-160° C., more preferably 85-140° C. and/or
 a melt viscosity at a temperature of 170° C. determined according to DIN 53019-1:2008 standard in the range of 10-10000 mPa·s, preferably 100 to 5000 mPa·s, more preferably 500-3500 mPa·s. The melt viscosity can be determined by busing a rotational viscometer at 5 revolutions per minute, for example by using a Brookfield DV-2 Thermosel viscometer with a spindle No. 27.

According to one or more embodiments, the at least one wax is a polyolefin wax. The term "polyolefin wax" designates in the present document low molecular weight polymers of linear or branched α-olefins having from 2 to 30 carbon atoms and a number average molecular weight ($M_n$) in the range of 5000-25000 g/mol. They include both homopolymers and copolymers of the above mentioned linear or branched α-olefins. Polyolefin waxes can be obtained by thermal decomposition of polyolefin plastics, in particular polyethylene plastic, or by direct polymerization of olefins. Suitable polymerization processes include, for example, free-radical processes, where the olefins, for example, ethylene, are reacted at high pressures and temperatures to give more or less branched waxes and processes, where ethylene and/or higher α-olefins, in particular propylene, are polymerized using metalorganic catalysts, for example Ziegler-Natta or metallocene catalysts, to give unbranched or branched waxes. The polyolefin waxes have generally at least partially crystalline structure.

According to one or more embodiments, the at least one wax W is a paraffin wax, preferably a Fischer-Tropsch wax. The term "paraffin wax" designates in the present disclosure hard, crystalline wax composed mainly of saturated paraffin hydrocarbons. The paraffin waxes are typically obtained from petroleum distillates or derived from mineral oils of the mixed-base or paraffin-base type.

According to one or more embodiments, the at least one wax W is an amide wax. The term "amide wax" designates in the present document waxes containing an amide bond (—CONH—) in the molecule or an amide group (—CONH$_2$) at the end of the molecule. According to one or more embodiments, the at least one wax W is an amide wax selected from the group consisting of N,N'-ethylenebis (stearoamide), stearic acid amide, N,N'-methylenebis (stearoamide),and methylolstearoamide.

According to a first preferred embodiment, the acoustic damping material comprises:
b1) 25-65 wt.-%, preferably 35-55 wt.-%, of the bitumen component BC,
b2) 0-10 wt.-%, preferably 0.25-5 wt.-% of the at least one hydrocarbon resin HR, and
b3) 0-10 wt.-%, preferably 0.25-7.5 wt.-% of the at least one wax W, all proportions being based on the total weight of the acoustic damping material.

Acoustic damping materials according to the first preferred embodiment can be characterized as "bitumen-based damping materials".

The term "bitumen" designates in the present disclosure blends of heavy hydrocarbons, having a solid consistency at room temperature. These are normally obtained as vacuum residue from refinery processes, which can be distillation (topping or vacuum) and/or conversion processes, such as thermal cracking and visbreaking, of suitable crude oils. Furthermore, the term "bitumen" also designates natural and synthetic bitumen as well as bituminous materials obtained from the extraction of tars and bituminous sands.

The bitumen component BC can comprise one of more different types of bitumen materials, such as penetration grade (distillation) bitumen, air-rectified (semi-blown) bitumen, and hard grade bitumen.

The term "penetration grade bitumen" refers here to bitumen obtained from fractional distillation of crude oil. A heavy fraction composed of high molecular weight hydrocarbons, also known as long residue, which is obtained after removal of gasoline, kerosene, and gas oil fractions, is first distilled in a vacuum distillation column to produce more gas oil, distillates, and a short residue. The short residue is then used as a feed stock for producing different grades of bitumen classified by their penetration index, typically defined by a PEN value, which is the distance in tenth millimeters (dmm) that a needle penetrates the bitumen under a standard test method. Penetration grade bitumen are characterized by penetration and softening point. The term "air-rectified bitumen" or "air-refined bitumen" refers in the present disclosure to a bitumen that has been subjected to mild oxidation with the goal of producing a bitumen that meets paving-grade bitumen specifications. The term "hard grade bitumen" refers in the present disclosure to bitumen produced using extended vacuum distillation with some air rectification from propane-precipitated bitumen. Hard bitumen typically has low penetration values and high softening-points.

According to one or more embodiments, the bitumen component BC comprises at least 75 wt.-%, preferably at least 85 wt.-%, more preferably at least 90 wt.-% of at least one penetration grade bitumen, preferably having a penetration value in the range of 15-50 dmm, more preferably 20-45 dmm and/or a softening point determined by Ring and Ball measurement conducted according to DIN EN 1238:2011 standard in the range of 40-125° C., preferably 50-100° C.

In case of a bitumen-based damping material, the acoustic damping material preferably further comprises at least one modifying polymer MP for the bitumen component BC.

Suitable polymers for use as the at least one modifying polymer MP include, for example, atactic polypropylenes (APP), amorphous polyolefins (APO), styrene block copolymers, and elastomers. The term "amorphous polyolefin" refers polyolefins to having a low crystallinity degree determined by a differential scanning calorimetry (DSC) measurements, such as in the range of 0.001-10 wt.-%, preferably 0.001-5 wt.-%. The crystallinity degree of a polymer can be determined by using the differential scanning calorimetry measurements conducted according to ISO 11357-3:2018 standard to determine the heat of fusion, from which the degree of crystallinity is calculated. In particular, the term "amorphous polyolefin" designates poly-α-olefins lacking a crystalline melting point ($T_m$) as determined by differential scanning calorimetric (DSC) or equivalent technique.

Suitable amorphous polyolefins for use as the at least one modifying polymer MP include, for example, atactic polypropylene, amorphous propene rich copolymers of propylene and ethylene, amorphous propene rich copolymers of propylene and butene, amorphous propene rich copolymers of propylene and hexene, and amorphous propene rich terpolymers of propylene, ethylene, and butene. The term "propene rich" is understood to mean copolymers and terpolymers having a content of propene derived units of at least 50 wt.-%, preferably at least 65 wt.-%, more preferably at least 70 wt.-%, based on total weight of the copolymer/terpolymer.

Suitable styrene block copolymers for use as the at least one modifying polymer MP include, in particular, block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), or completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks. Preferred styrene block copolymers for use as the at least one modifying polymer MP include SBS, SIS, SIBS, SEBS, and SEPS block copolymers, in particular SBS block copolymer, preferably having a linear, radial, diblock, triblock or star structure.

Suitable elastomers for use as the at least one modifying polymer MP include, for example, styrene-butadiene rubber (SBR), ethylene propylene diene monomer rubber (EPDM), polyisoprene, polybutadiene, natural rubber, polychloroprene rubber, ethylene-propylene rubber (EPR), nitrile rubbers, and acrylic rubbers.

According to one or more embodiments, the at least one modifying polymer MP is selected from the group consisting of atactic polypropylenes (APP), amorphous polyolefins (APO), styrene block copolymers, styrene-butadiene rubber (SBR), ethylene propylene diene monomer rubber (EPDM), polyisoprene, polybutadiene, natural rubber, polychloroprene rubber, ethylene-propylene rubber (EPR), nitrile rubbers, and acrylic rubbers.

According to one or more embodiments, the at least one modifying polymer MP comprises 0.5-10 wt.-%, preferably 1-7.5 wt.-% of the total weight of the acoustic damping material.

In case of a bitumen-based damping material, it may be preferable that the acoustic damping material is substantially free of cross-linking/curing agents, such as free-radical cross-linking agents, for example peroxides. The phrase "substantially free" is intended to mean that if an amount of a cross-linking agent is found in the acoustic damping material, the amount of said amount is so negligible that the effect of the cross-linking agent cannot be obtained. In other words, the amount of a cross-linking agent found in the acoustic damping material cannot initiate curing of the polymeric components, in particular curing of the at least one modifying polymer MP or can initiate only a substantially negligible amount of cross-linking.

According to one or more embodiments, the bitumen-based damping material contains less than 0.15 wt.-%, preferably less than 0.1 wt.-%, more preferably less than 0.01 wt.-%, even more preferably 0 wt.-%, of cross-linking/curing agents, based on the total weight of the bitumen-based damping material.

According to a second preferred embodiment, the acoustic damping material comprises:
a2) 0.5-25 wt.-%, preferably 1.5-20 wt.-% of the polymer component PC comprising at least one thermoplastic polymer TP,
a3) 2.5-35 wt.-%, preferably 5-30 wt.-% of the at least one hydrocarbon resin HR,
a4) 0-15 wt.-%, preferably 0.5-10 wt.-% of the at least one wax W, and
a5) 0-30 wt.-%, preferably 0.5-15 wt.-% of the at least one plasticizer PL, all proportions being based on the total weight of the acoustic damping material.

Acoustic damping materials according to the second preferred embodiment can be characterized as "bitumen-free thermoplastic damping materials".

In case of a bitumen-free thermoplastic damping material, the polymer component PC comprises at least one thermoplastic polymer TP and the portion of the bitumen component BC in the binder matrix has been replaced by a specific combination of the at least one thermoplastic polymer TP and the at least one hydrocarbon resin HR as well as the at least one wax W and the at least one plasticizer PL, which are optionally added to the binder matrix. The use of such binder matrixes has been found out to enable providing bitumen-free thermoplastic damping materials, which can be processed into shaped articles using conventional thermoplastic processing methods, such as extrusion, calendering, injection molding, and hot-pressing techniques.

According to one or more embodiments, the bitumen-free thermoplastic damping material comprises less than 1 wt.-%, preferably less than 0.5 wt.-%, more preferably less than 0.1 wt.-%, even more preferably less than 0.01 wt.-% of bitumen, based on the total weight of the bitumen-free thermoplastic damping material.

The composition of the polymer component PC of a bitumen-free thermoplastic damping material is preferably selected such that the temperature range at which the maximum vibration damping effect of the damping material coincides with the range of temperatures to which the surface of a substrate to be damped against vibrations is subjected during its use.

Since the ability of polymers to dissipate vibrations to heat energy is at maximum when the polymer is in a transition state between the hard/glassy and soft/rubbery state, preferred thermoplastic polymers TP to be used in the bitumen-free thermoplastic damping material have a glass transition temperature ($T_g$) falling within the intended range of application temperatures. For example, in case the bitumen-free thermoplastic damping material is used for damping of vibrations and noise in structures of automotive vehicles, the application temperatures typically range from −40° C. to 60° C., in particular from −35° C. to 50° C. On the other hand, preferred thermoplastic polymers TP to be used in the polymer component PC have a softening point ($T_s$) and/or a melting temperature ($T_m$) above the maximum application temperature of the bitumen-free thermoplastic damping material.

According to one or more embodiments, the at least one thermoplastic polymer TP has:
a glass transition temperature ($T_g$) determined by dynamical mechanical analysis (DMA) as the peak of the measured loss modulus (G") curve using an applied frequency of 1 Hz and a strain level of 0.1% of below 25° C., preferably below 5° C., more preferably below 0° C. and/or
a softening point ($T_s$) determined by Ring and Ball measurement conducted according to DIN EN 1238:2011 standard of above 35° C., preferably above 45° C., more preferably above 55° C., such as in the range of 35-250° C., preferably 45-200° C., more preferably 55-180° C.

According to one or more embodiments, the polymer component PC is composed of the at least one thermoplastic polymer TP.

The type of the at least one thermoplastic polymer TP is not particularly restricted. Various types of thermoplastic polymers, including crystalline, semi-crystalline, and amorphous polymers and thermoplastic elastomers are suitable for use as the at least one thermoplastic polymer TP.

According to one or more embodiments, the at least one thermoplastic polymer TP is selected from the group consisting of polyolefin homopolymers and copolymers, copolymers of ethylene with vinyl acetate, and thermoplastic olefin elastomers (TPE-O).

Suitable polyolefin homopolymers and copolymers include, for example, ethylene homopolymers, ethylene-α-olefin copolymers, propylene homopolymers, and propylene-α-olefin copolymers.

Suitable ethylene-α-olefin copolymers include, for example, ethylene-α-olefin random and block copolymers of ethylene and one or more C3-C20 α-olefin monomers, in particular one or more of propylene, 1-butene, 1-pentene, 1-hexene, 1-heptene, 1-octene, 1-decene, 1-dodecene, and 1-hexadodecene, preferably comprising at least 50 wt.-%, more preferably at least 60 wt.-% of ethylene-derived units, based on the total weight of the copolymer.

Suitable propylene-α-olefin copolymers include propylene-ethylene random copolymers and propylene-α-olefin random and block copolymers of propylene and one or more $C_4$-$C_{20}$ α-olefin monomers, in particular one or more of 1-butene, 1-pentene, 1-hexene, 1-heptene, 1-octene, 1-decene, 1-dodecene, and 1-hexadodecene, preferably comprising at least 50 wt.-%, more preferably at least 60 wt.-% of propylene-derived units, based on the total weight of the copolymer.

Suitable copolymers of ethylene and vinyl acetate include those having a content of a structural unit derived from vinyl acetate in the range of 4-90 wt.-%, in particular 4-80 wt.-%, based on the total weight of the copolymer. Suitable copolymers of ethylene and vinyl acetate are commercially available, for example, under the trade name of Escorene®

(from Exxon Mobil), under the trade name of Primeva® (from Repsol Quimica S.A.), and under the trade name of Evatane® (from Arkema Functional Polyolefins).

Suitable ethylene-α-olefin copolymers include, for example, ethylene-based polyolefin elastomers (POE), which are commercially available, for example, under the trade name of Engage®, such as Engage® 7256, Engage® 7467, Engage® 7447, Engage® 8003, Engage® 8100, Engage® 8480, Engage® 8540, Engage® 8440, Engage® 8450, Engage® 8452, Engage® 8200, and Engage® 8414 (all from Dow Chemical Company).

Other suitable ethylene-α-olefin copolymers include, for example, ethylene-based plastomers, which are commercially available, for example, under the trade name of Affinity®, such as Affinity® EG 8100G, Affinity® EG 8200G, Affinity® SL 8110G, Affinity® KC 8852G, Affinity® VP 8770G, and Affinity® PF 1140G (all from Dow Chemical Company) and under the trade name of Exact®, such as Exact® 3024, Exact® 3027, Exact® 3128, Exact® 3131, Exact® 4049, Exact® 4053, Exact® 5371, and Exact® 8203 (all from Exxon Mobil).

Further suitable ethylene-α-olefin copolymers include ethylene-α-olefin block copolymers, such as ethylene-based olefin block copolymers (OBC), which are commercially available, for example, under the trade name of Infuse®, such as Infuse® 9100, Infuse® 9107, Infuse® 9500, Infuse® 9507, and Infuse® 9530 (all from Dow Chemical Company).

Suitable propylene-α-olefin copolymers include, for example, propylene-based elastomers (PBE) and propylene-based plastomers (PBP), which are commercially available, for example, under the trade name of Versify® (from Dow Chemical Company) and under the trade name of Vistamaxx® (from Exxon Mobil).

Further suitable polyolefin homopolymers and copolymers include at 25° C. solid amorphous poly-α-olefins. These are commercially available, for example, under the trade name of Vestoplast® (from Evonik Industries), under the trade name of Eastoflex® (from Eastman Corporation), and under the trade name of REXtac® (from REXtac LLC).

Thermoplastic olefin elastomers (TPE-O), which are also known as thermoplastic polyolefins (TPO), are also suitable for use as the at least one thermoplastic polymer TP. TPOs are heterophase polyolefin compositions containing a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Commercially available TPOs include reactor blends of the base polyolefin and the polyolefin modifier, also known as "in-situ TPOs" or "impact copolymers (ICP)", as well as physical blends of the aforementioned components. In case of a reactor-blend type of TPO, the components are typically produced in a sequential polymerization process, wherein the components of the matrix phase are produced in a first reactor and transferred to a second reactor, where the components of the dispersed phase are produced and incorporated as domains in the matrix phase. A physical-blend type of TPO is produced by melt-mixing the base polyolefin with the polyolefin modifier each of which was separately formed prior to blending of the components.

Reactor-blend type TPOs comprising polypropylene as the base polymer are often referred to as "heterophasic propylene copolymers" whereas reactor-blend type TPOs comprising polypropylene random copolymer as the base polymer are often referred to as "heterophasic propylene random copolymers". Depending on the amount of the polyolefin modifier, the commercially available heterophasic propylene copolymers are typically characterized as "impact copolymers" (ICP) or as "reactor-TPOs" or as "soft-TPOs". The main difference between these types of TPOs is that the amount of the polyolefin modifier is typically lower in ICPs than in reactor-TPOs and soft-TPOs, such as not more than 40 wt.-%, in particular not more than 35 wt.-%. Consequently, typical ICPs tend to have a lower xylene cold soluble (XCS) content determined according to ISO 16152:2005 standard as well as higher flexural modulus determined according to ISO 178:2010 standard compared to reactor-TPOs and soft-TPOs.

Suitable TPOs are commercially available, for example, under the trade name Hifax®, Adflex® and Adsyl® (all from Lyondell Basell), such as Hifax® CA 10A, Hifax® CA 12A, and Hifax® CA 212 A and under the trade name of Borsoft® (from Borealis Polymers), such as Borsoft® SD233 CF.

In acoustic damping applications it is generally desirable to maximize the broadness of the range of temperatures at which the vibration and noise damping effect of the acoustic damping material is at maximum, in particular the range of temperatures at which the measured loss factor of the damping material has a value of above 0.1. Since the maximum vibration damping effect of thermoplastic polymers typically occurs at a narrow range of temperatures, i.e. when the polymer is in its transition state, it may be preferred that the bitumen-free thermoplastic damping material comprises at least two different thermoplastic polymers having different glass transition temperatures ($T_g$).

It can furthermore be advantageous that the at least two different thermoplastic polymers are not entirely miscible with each other and/or that the at least two different thermoplastic polymers can be mixed with each other to form a semi-compatible polymer blend containing micro-incompatible phases. By the polymers being "entirely miscible" with each other is meant that a polymer blend composed of the at least two thermoplastic polymers has a negative Gibbs free energy and heat of mixing. The polymer blends composed of entirely miscible polymers tend to have one single glass transition temperature ($T_g$) as measured by using dynamic mechanical analysis (DMA).

According to one or more embodiments, the at least one thermoplastic polymer TP comprises:

b11) At least one hard thermoplastic polymer TP1, preferably at least one hard ethylene vinyl acetate copolymer, having a melt flow index (MFI) determined according to ISO 1133 (190° C./2.16 kg) of not more than 50 g/10 min, preferably not more than 35 g/10 min, more preferably not more than 25 g/10 min, even more preferably not more than 15 g/10 min, still more preferably not more than 10 g/10 min and/or having a glass transition temperature ($T_g$) determined by dynamical mechanical analysis (DMA) as the peak of the measured loss modulus (G") curve using an applied frequency of 1 Hz and a strain level of 0.1% of below 5° C., preferably below 0° C., more preferably below −10° C., even more preferably below −20° C. and/or b12) At least one soft thermoplastic polymer TP2, preferably at least one soft ethylene vinyl acetate copolymer, having a melt flow index (MFI) determined according to ISO 1133 (190° C./2.16 kg) of at least 75 g/10 min, preferably at least 100 g/10 min, more preferably at least 150 g/10 min, even more preferably at least 200 g/10 min, most preferably at least 250 g/10 min and/or having a glass transition temperature ($T_g$) determined by dynamical mechanical analysis (DMA)

as the peak of the measured loss modulus (G") curve using an applied frequency of 1 Hz and a strain level of 0.1% of below 5° C., preferably below −0° C., more preferably below −10° C., even more preferably below −20° C.

According to one or more embodiments, the at least one thermoplastic polymer TP further comprises:
B13) At least one polyolefin TP3, wherein the at least one polyolefin TP3 is preferably not entirely miscible with the at least one hard thermoplastic polymer TP1 and/or with the at least one soft thermoplastic polymer TP2.

According to one or more embodiments, the at least one thermoplastic polymer TP comprises the at least one hard thermoplastic polymer TP1 and the least one polyolefin TP3.

According to one or more embodiments, the at least one thermoplastic polymer TP comprises the at least one soft thermoplastic polymer TP2 and the least one polyolefin TP3.

According to one or more further embodiments, the at least one thermoplastic polymer TP comprises the at least one hard thermoplastic polymer TP1, the at least one soft thermoplastic polymer TP2, and the least one polyolefin TP3.

According to one or more embodiments, the at least one hard thermoplastic polymer TP1 is an ethylene vinyl acetate copolymer having a content of a structural unit derived from vinyl acetate of not more than 20 wt.-%, preferably not more than 15 wt.-%, based on the total weight of the copolymer and/or the at least one soft thermoplastic polymer TP2 is an ethylene vinyl acetate copolymer having a content of a structural unit derived from vinyl acetate of at least 15 wt.-%, preferably at least 20 wt.-%, based on the total weight of the copolymer.

According to one or more embodiments, the at least one hard thermoplastic polymer TP1 comprises at least 5 wt.-%, preferably 10-35 wt.-% of the total weight of the at least one thermoplastic polymer TP and/or the at least one soft thermoplastic polymer TP2 comprises at least 10 wt.-%, preferably 15-45 wt.-% of the total weight of the at least one thermoplastic polymer TP and/or the at least one polyolefin TP3 comprises at least 25 wt.-%, preferably 30-75 wt.-% of the total weight of the at least one thermoplastic polymer TP.

The type of the at least one polyolefin TP3 is not particularly restricted in the present invention. Preferably, the at least one polyolefin TP3 is not entirely miscible with the at least one hard thermoplastic polymer TP1 and/or the at least one soft thermoplastic polymer TP2. It may furthermore be preferred that the at least one polyolefin TP3 can be mixed with the at least one hard thermoplastic polymer TP1 and/or with the at least one soft thermoplastic polymer TP2 to form a semi-compatible polymer blend containing micro-incompatible phases.

According to one or more embodiments, the at least one polyolefin TP3 is selected from the group consisting of at 25° C. solid poly-α-olefins and propylene-based elastomers.

Suitable at 25° C. solid poly-α-olefins to be used as the at least one polyolefin TP3 include, for example, homopolymers, copolymers, and terpolymers of monomers selected from the group consisting of ethylene, propylene, 1-butene and higher α-olefins. Especially suitable at 25° C. solid poly-α-olefins include homopolymers of propylene, copolymers of propylene and ethylene, copolymers of propylene and 1-butene or other higher α-olefins, homopolymers of ethylene, copolymers of ethylene and propylene, copolymers of ethylene and 1-butene or other higher α-olefins, and terpolymers of ethylene, propylene, and 1-butene.

According to one or more embodiments, the at least one polyolefin TP3 comprises at least one propylene-based elastomer TP31, preferably having:
a melting temperature ($T_m$) as determined by DSC according to ISO 11357-3:2018 standard of not more than 135° C., preferably not more than 125° C., more preferably not more than 115° C. and/or
an average molecular weight ($M_n$) in the range of 10000-300000 g/mol, preferably 25000-250000 g/mol and/or
a melt flow index measured according to ASTM D1238 (230° C./2.16 kg) of 2-30 g/10 min, preferably 2-20 g/10 min.

Suitable propylene-based elastomers include, in particular, copolymers of propylene and at least one comonomer selected from the group consisting of ethylene and $C_4$-$C_{10}$ α-olefins, wherein the copolymer comprises at least 65 wt.-%, preferably at least 70 wt.-% propylene-derived units, based on the total weight of the copolymer and 1-35 wt.-%, preferably 5-25 wt.-% units derived from at least one of ethylene or a $C_4$-$C_{10}$ α-olefin, based on the total weight of the copolymer.

According to one or more embodiments, the at least one propylene-based elastomer TP31 is a copolymer of propylene and ethylene comprising 80-90 wt.-%, preferably 82-90 wt.-% of propylene-derived units, based on the total weight of the propylene-based elastomer and 9-18 wt.-%, preferably 12-16 wt.-% of ethylene-derived units based on the total weight of the propylene-based elastomer.

According to one or more embodiments, the at least one propylene-based elastomer TP31 has:
a Vicat softening point determined according to ASTM 1525 standard using a weight of 200 g of equal or less than 95° C., preferably equal or less than 85° C., more preferably equal or less than 75° C. and/or
a heat of fusion as determined by DSC of not more than 50 J/g, preferably not more than 25 J/g, more preferably not more than 15 J/g, even more preferably not more than 10 J/g and/or
a percent crystallinity as determined by DSC procedure of not more than 25%, preferably not more than 10%, more preferably not more than 2.5% of that of isotactic polypropylene.

Regarding the determination of the percent crystallinity of the propylene-based elastomer, the heat of fusion of isotactic polypropylene (100% crystallinity) is estimated at 189 J/g.

Suitable propylene-based elastomers are commercially available, for example, under the trade name of Vistamaxx® (from Exxon Mobil) and under the trade name of Versify® (from Dow Chemical Company).

According to one or more embodiments, the at least one polyolefin TP3 comprises at least one at 25° C. solid amorphous poly-α-olefin TP32, preferably having:
a softening point ($T_s$) determined by using the Ring and Ball method as defined in DIN EN 1238:2011 standard in the range of 60-200° C., preferably 75-180° C., more preferably 85-180° C. and/or
an average molecular weight ($M_n$) in the range of 2500-35000 g/mol, preferably 3000-30000 g/mol, more preferably 5000-25000 g/mol and/or
a melt viscosity at 190° C. determined according to DIN 53019-1:2008 standard of not more than 150000 MPa·s, preferably not more than 135000 MPa·s, more preferably not more than 125000 MPa·s. The melt viscosity can be determined by busing a rotational viscometer at 5 revolutions per minute, for example by using a Brookfield DV-2 Thermosel viscometer with a spindle No. 27.

The term "amorphous poly-α-olefin" designates in the present disclosure poly-α-olefins having a low crystallinity degree determined by a differential scanning calorimetry (DSC) measurements, such as in the range of 0.001-10 wt.-%, preferably 0.001-5 wt.-%. The crystallinity degree of a polymer can be determined by using DSC measurements to determine the heat of fusion of the polymer, from which the degree of crystallinity is calculated. In particular, the term "amorphous poly-α-olefin" designates poly-α-olefins lacking a crystalline melting temperature ($T_m$) as determined by DSC or equivalent technique.

According to one or more embodiments, the at least one at 25° C. solid amorphous poly-α-olefin TP32 has a xylene cold soluble content (XCS) determined at 25° C. according ISO 16152-2005 standard of at least 80 wt.-%, preferably at least 90 wt.-%, more preferably at least 95 wt.-% and/or a heat of fusion ($H_f$) as determined by DSC measurements of not more than 35 J/g, preferably not more than 25 J/g, more preferably not more than 15 J/g.

Examples of suitable at 25° C. solid amorphous poly-α-olefins include amorphous atactic polypropylene, amorphous propene rich propylene-α-olefin copolymers and terpolymers, in particular amorphous propylene-ethylene copolymers, amorphous propylene-butene copolymers, amorphous propylene-hexene copolymers, and amorphous propylene-ethylene-butene terpolymers. Such amorphous poly-α-olefins are known to a person skilled in the art and they can be obtained, for example, by polymerization of α-olefins in the presence of a polymerization catalyst, such as a Ziegler-Natta catalyst or a metallocene catalyst or any other single-site catalyst.

Suitable at 25° C. solid amorphous poly-α-olefins are commercially available, for example, under the trade name of Vestoplast® (from Evonik Industries), under the trade name of Eastoflex® (from Eastman Corporation), and under the trade name of REXtac® (from REXtac LLC).

According to one or more further embodiments, the at least one polyolefin TP3 consists of the at least one propylene-based elastomer TP31. According to one or more embodiment, the at least one polyolefin TP3 consists of the at least one at 25° C. solid amorphous poly-α-olefin TP32. According to one or more further embodiments, the at least one polyolefin TP3 comprises the at least one propylene-based elastomer TP31 and the at least one at 25° C. solid amorphous poly-α-olefin TP32.

According to one or more embodiments, the at least one thermoplastic polymer TP comprises 3-15 wt.-%, preferably 3.5-12.5 wt.-%, more preferably 5-12.5 wt.-% of the total weight of the bitumen-free thermoplastic damping material and/or wherein the at least one hydrocarbon resin HR comprises 5-30 wt.-%, preferably 10-25 wt.-%, more preferably 12.5-20 wt.-%, even more preferably 15-18.5 wt.-% of the total weight of the bitumen-free thermoplastic damping material, wherein the at least one hydrocarbon resin HR is preferably a hydrogenated hydrocarbon resin.

According to one or more embodiments, the at least one wax W comprises at least 0.5 wt.-%, preferably 1-15 wt.-%, more preferably 2.5-10 wt.-%, even more preferably 2.5-7.5 wt.-%, still more preferably 3.5-7.5 wt.-% of the total weight of the a bitumen-free thermoplastic damping material and/or wherein the at least one plasticizer PL comprises at least 0.5 wt.-%, preferably 1-15 wt.-%, more preferably 2.5-10 wt.-%, even more preferably 2.5-7.5 wt.-%, still more preferably 3.5-7.5 wt.-% of the total weight of the bitumen-free thermoplastic damping material.

Preferred plasticizers PL are liquids, wherein the term "liquid" is defined as a material that flows at normal room temperature, has a pour point of less than 20° C. and/or a kinematic viscosity at 25° C. of 50'000 cSt or less. Preferably, the at least one plasticizer PL is selected from the group consisting of process oils and at 25° C. liquid hydrocarbon resins.

According to one or more embodiments, the at least one plasticizer PL comprises at least one process oil PL1 selected from the group consisting of mineral oils, synthetic oils, and vegetable oils.

The term "mineral oil" refers in the present disclosure hydrocarbon liquids of lubricating viscosity (i.e., a kinematic viscosity at 100° C. of 1 cSt or more) derived from petroleum crude oil and subjected to one or more refining and/or hydroprocessing steps, such as fractionation, hydrocracking, dewaxing, isomerization, and hydrofinishing, to purify and chemically modify the components to achieve a final set of properties. In other words, the term "mineral" refers in the present disclosure to refined mineral oils, which can be also characterized as Group 1-111 base oils according the classification of the American Petroleum Institute (API).

Suitable mineral oils to be used as the at least one process oil PL1 include paraffinic, naphthenic, and aromatic mineral oils. Particularly suitable mineral oils include paraffinic and naphtenic oils containing relatively low amounts of aromatic moieties, such as not more than 25 wt.-%, preferably not more than 15 wt.-%, based on the total weight of the mineral oil.

The term "synthetic oil" refers in the present disclosure to full synthetic (polyalphaolefin) oils, which are also known as Group IV base oils according to the classification of the American Petroleum Institute (API). Suitable synthetic oils are produced from liquid polyalphaolefins (PAOs) obtained by polymerizing α-olefins in the presence of a polymerization catalyst, such as a Friedel-Crafts catalyst. In general, liquid PAOs are high purity hydrocarbons with a paraffinic structure and high degree of side-chain branching. Particularly suitable synthetic oils include those obtained from so-called Gas-To-Liquids processes.

According to one or more embodiments, the at least one plasticizer PL comprises at least one at 25° C. liquid hydrocarbon resin PL2.

Suitable at 25° C. liquid hydrocarbon resins include at 25° C. liquid polybutenes and at 25° C. liquid polyisobutylenes (PIB). The term "at 25° C. liquid polybutene" designates in the present disclosure low molecular weight olefin oligomers comprising isobutylene and/or 1-butene and/or 2-butene. The ratio of the $C_4$-olefin isomers can vary by manufacturer and by grade. When the $C_4$-olefin is exclusively 1-butene, the material is referred to as "poly-n-butene" or "PNB". The term "at 25° C. liquid polyisobutylene" designates in the present disclosure low molecular weight polyolefins and olefin oligomers of isobutylene, preferably containing at least 75%, more preferably at least 85% of repeat units derived from isobutylene. Particularly suitable at 25° C. liquid polybutenes and polyisobutylenes to be used as the at least one at 25° C. liquid hydrocarbon resin PL2 have a molecular weight ($M_n$) of not more than 10000 g/mol, preferably not more than 5000 g/mol, more preferably not more than 3500 g/mol, even more preferably not more than 3000 g/mol, still more preferably not more than 2500 g/mol.

Liquid polybutenes are commercially available, for example, under the trade name of Indopol® H- and L-series (from Ineos Oligomers), under the trade name of Infineum® C-series and Parapol® series (from Infineum), and under the trade name of PB-series (Daelim). Liquid polyisobutylenes (PIBs) are commercially available, for example, under the trade name of Glissopal® V-series (from BASF) and and under the trade name of Dynapak®-series (from Univar GmbH, Germany).

According to one or more embodiments, the at least one plasticizer PL consists of the at least one process oil PL1, preferably selected from the group consisting of mineral oils, synthetic oils, and vegetable oils.

According to one or more further embodiments, the at least one plasticizer PL consists of the at least one at 25° C. liquid hydrocarbon resin PL2, preferably selected from the group consisting of liquid polybutenes and liquid polyisobutylenes (PIB), preferably having a molecular weight ($M_n$) of not more than 5'000 g/mol, more preferably not more than 3'500 g/mol, even more preferably not more than 3'000 g/mol and/or a polydispersity index (Mw/Mn) determined by gel permeation-chromatography (GPC) of not more than 7.5, more preferably not more than 5.0, such as in the range of 0.5-5.0, preferably 1.0-4.5, more preferably 1.0-3.5, even more preferably 1.25-2.5.

According to a third preferred embodiment, the acoustic damping material comprises:
- b1) 0.5-20 wt.-%, preferably 2.5-15 wt.-% of the polymer component PC comprising at least one elastomer E,
- b2) 0.5-35 wt.-%, preferably 2.5-25 wt.-% of the at least one hydrocarbon resin HR,
- b3) 0-15 wt.-%, preferably 0.5-10 wt.-% of the at least one wax W, and
- b4) 0-30 wt.-%, preferably 0.5-25 wt.-% of the at least one plasticizer PL, all proportions being based on the total weight of the acoustic damping material, all proportions being based on the total weight of the acoustic damping material.

Acoustic damping materials according to the third preferred embodiment can be characterized as "bitumen-free elastomeric damping materials". According to one or more embodiments, the bitumen-free elastomeric damping material comprises less than 1 wt.-%, preferably less than 0.5 wt.-%, more preferably less than 0.1 wt.-%, even more preferably less than 0.01 wt.-% of bitumen, based on the total weight of the bitumen-free elastomeric damping material.

According to one or more embodiments, the at least one elastomer E is selected from the group consisting of butyl rubber, halogenated butyl rubber, ethylene-propylene diene monomer rubber, natural rubber, chloroprene rubber, synthetic 1,4-cis-polyisoprene, polybutadiene rubber, ethylene-propylene rubber, styrene-butadiene rubber, isoprene-butadiene rubber, styrene-isoprene-butadiene rubber, acrylonitrile-isoprene rubber, and acrylonitrile-butadiene rubber, preferably from the group consisting of butyl rubber, halogenated butyl rubber, ethylene-propylene diene monomer rubber, chloroprene rubber, synthetic 1,4-cis-polyisoprene, polybutadiene rubber, and ethylene-propylene rubber.

The term "butyl rubber" designates in the present document a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin. The preferred $C_4$ to $C_7$ monoolefin monomer may be selected from the group consisting of isobutylene, 2-methyl-1-butene, 3-methyl-1-butene, 2-methyl-2-butene, 4-methyl-1-pentene, and mixtures thereof.

The preferred $C_4$ to $C_{14}$ multiolefin comprises a $C_4$ to $C_{10}$ conjugated diolefin. The preferred $C_4$ to $C_{10}$ conjugated diolefin may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

According to one or more embodiments, the at least one elastomer E comprises 3-15 wt.-%, preferably 3.5-12.5 wt.-%, more preferably 5-12.5 wt.-% of the total weight of the bitumen-free elastomeric damping material.

According to one or more embodiments, the polymer component PC comprises, in addition to the at least one elastomer E, at least one thermoplastic polymer TMP, preferably selected from the group consisting of polyolefin homopolymers and copolymers, copolymers of ethylene with vinyl acetate, and thermoplastic olefin elastomers (TPE-O)

The preferences given above for the at least one thermoplastic polymer TP used in the bitumen-free thermoplastic damping material apply also to the at least one thermoplastic polymer TMP used in the bitumen-free elastomeric damping material.

According to one or more embodiments, the weight ratio of the amount of the at least one elastomer E to the amount of the at least one thermoplastic polymer TMP is in the range of 10:1 to 1:3, preferably 5:1 to 1:2, more preferably 5:1 to 1:1.

According to one or more embodiments, the bitumen-free elastomeric damping material further comprises a vulcanization system VS.

A large number of vulcanization systems based on elementary sulfur as well as vulcanization systems not containing elementary sulfur are suitable.

In case a vulcanization system based on elementary sulfur is used, the vulcanization system VS preferably contains pulverulent sulfur, more preferably at least one sulfur compound selected from the group consisting of powdered sulfur, precipitated sulfur, high dispersion sulfur, surface-treated sulfur, and insoluble sulfur.

Preferred vulcanization systems based on elementary sulfur comprise 1-15 wt.-%, more preferably 5-10 wt.-% of pulverulent sulfur, preferably at least one sulfur compound selected from the group consisting of powdered sulfur, precipitated sulfur, high dispersion sulfur, surface-treated sulfur, and insoluble sulfur, based on the total weight of the vulcanization system.

According to one or more embodiments, the vulcanization system VS is a vulcanization system without elementary sulfur.

Preferred vulcanization systems without elementary sulfur comprise at least one vulcanization agent and optionally at least one organic vulcanization accelerator and/or at least one inorganic vulcanization accelerator.

Suitable vulcanization agents for vulcanization systems without elementary sulfur include, for example, organic peroxides, phenolic resins, bisazidoformates, polyfunctional amines, para-quinone dioxime, para-benzoquinone dioxime, para-quinone dioxime dibenzoate, p-nitrosobenzene, dinitrosobenzene, thiuram compounds, bismaleimides, dithiols, zinc oxide as well as vulcanization systems crosslinked with (blocked) diisocyanates.

Suitable organic vulcanization accelerators to be used in vulcanization systems without elementary sulfur include thiocarbamates, dithiocarbamates (in the form of their ammonium or metal salts), xanthogenates, thiuram compounds (monosulfides and disulfides), thiazole compounds, aldehyde-amine accelerators, for example hexamethylenetetramine, and guanidine accelerators.

Suitable inorganic vulcanization accelerators to be used in vulcanization systems without elementary sulfur include, for example, zinc compounds, in particular zinc salts of fatty acids, basic zinc carbonates, and zinc oxide.

According to one or more embodiments, the vulcanization system VS is a vulcanization system without elementary sulfur, preferably containing at least one vulcanization agent selected from the group consisting of para-quinone dioxime, para-benzoquinone dioxime, para-quinone dioxime dibenzoate, p-nitrosobenzene, dinitrosobenzene, and thiuram compounds, preferably from the group consisting of para-quinone dioxime, para-benzoquinone dioxime, para-quinone dioxime dibenzoate, tetramethyl thiuram disulfide (TMTD), and tetrabenzylthiuram disulfide (TBzTD), and preferably further containing at least one organic vulcanization accelerator and/or at least one an inorganic vulcanization accelerator.

According to one or more embodiments, the at least one organic vulcanization accelerator is selected from the group consisting of cyclohexylbenzothiazole sulfonamide, mercaptobenzothiazole sulfide (MBTS), diphenyl guanidine, and zinc dimethyldithiocarbamate.

According to one or more embodiments, the at least one inorganic vulcanization accelerator is selected from the group consisting of zinc salts of fatty acids, basic zinc carbonates, and zinc oxide, more preferably zinc oxide.

According to one or more embodiments, the vulcanization system VS without elementary sulfur comprises 1-15 wt.-%, more preferably 1-12.5 wt.-%, even more preferably 2-10 wt.-%, most preferably 3.5-10 wt.-%, of the total weight of the bitumen-free elastomeric damping material.

The acoustic damping material may optionally contain additives, which are customary for acoustic damping materials. Examples of suitable additives include, for example, pigments, thixotropic agents, thermal stabilizers, drying agents, and flame retardants. These additives, if used at all, preferably comprise not more than 25 wt.-%, more preferably not more than 15 wt.-%, even more preferably not more than 10 wt.-%, of the total weight of the acoustic damping material.

According to one or more embodiments, the second layer of the damping element has a thickness in the range of 0.5-15 mm, preferably 1-10 mm, more preferably 1.5-7.5 mm, even more preferably 1.5-5 mm and/or a density in the range of 0.1-5 $g/cm^3$, preferably 0.2-4.5 $g/cm^3$, more preferably 0.3-3 $g/cm^3$, even more preferably 0.3-2.5 $g/cm^3$ and/or a mass per unit area of 1-5 $kg/m^2$, preferably 1-4.5 $kg/m^2$, more preferably 1.5-4.5 $kg/m^2$, still more preferably 1.5-3.5 $kg/m^2$.

Another subject of the present invention is a method for producing a damping element of the present invention, the method comprising steps of:
i) Providing the second layer composed of an acoustic damping material,
ii) Applying an expansion material directly on the surface of the second layer to provide the first layer, and
iii) Cutting the composite element provided in step ii) to a pre-determined length and/or width.

The second layer of the damping element can be provided by mixing the constituents of the acoustic damping material at an elevated temperature until a homogeneously mixed mixture is obtained followed by processing the homogeneously mixed mixture into a form of a shaped article.

The term "homogeneously mixed mixture" refers in the present disclosure to compositions, in which the individual constituents are distributed substantially homogeneously in the composition. Furthermore, a homogeneously mixed mixture can be multi-phase mixture. For example, a homogeneously mixed mixture of a polymer component and a filler component, therefore, refers to composition in which the constituents of the filler phase are homogeneously/uniformly distributed in the polymer phase. For a person skilled in the art it is clear that within such mixed compositions there may be regions formed, which have a slightly higher concentration of one of the constituents than other regions and that a 100% homogeneous distribution of all the constituents is generally not achievable. Such mixed compositions with "imperfect" distribution of constituents, however, are also intended to be included by the term "homogeneously mixed mixture" in accordance with the present invention.

Any conventional type of a mixing apparatus can be used for mixing of the constituents of the acoustic damping material. The mixing step can be conducted as a batch process using a conventional batch-type mixer, such as a Dreis mixer, a Brabender mixer, a Banbury mixer, or a roll mixer or as a continuous process using a continuous-type mixer, such as an extruder, in particular a single-, a twin-screw extruder or a planetary roller extruder. It may be advantageous to heat the constituents before or during mixing, either by applying external heat sources or by friction generated by the mixing process itself, in order to facilitate processing of the constituents into a homogeneously mixed mixture by decreasing viscosities and/or melting of individual constituents.

The homogeneously mixed mixture of the constituents of the acoustic damping material can subsequently be processed into a form of a shaped article by using any conventional techniques, such as extruding, blow-molding, injection molding, compression molding, calendering, or hot-pressing techniques.

The expansion material may be applied to the surface of the second layer of the damping element by using any suitable means, such as extrusion, co-molding, over-molding, or roll applicators.

For example, the constituents of the expansion material can be mixed at an elevated temperature until a homogeneously mixed mixture is obtained followed by extrusion of the homogeneously mixed mixture onto the surface of the second layer. However, care has to be taken, for example by temperature monitoring and using cooling devices where appropriate, not to exceed the activation temperature of the at least one chemical blowing agent CBA and/or the at least one physical blowing agent PBA. Upon cooling, the extruded expansion material then re-solidifies and adheres to the surface of the second layer.

Alternatively, a homogenously mixed mixture comprising the constituents of the expansion material can first be processed into a pre-formed article having desired size and shape, which article is then attached to the surface of the second layer, for example, by using mechanical fastening, thermal lamination, or adhesive means. The term "thermal lamination" refers here to a process comprising partially melting at least one of the layers upon application of thermal energy followed by a cooling step, which results in formation of a bond between the layers without using a separate bonding agent, such as an adhesive.

Step iii) of the method for producing a damping element can be conducted, for example, by punch or die cutting.

Another subject of the present invention is use of the damping element of the present invention for damping of vibrations and/or noises of structures in transportation vehicles or white goods or for baffling and/or reinforcing of structures in transportation vehicles.

Still another subject of the present invention is a method for preparing a vibration and/or noise damped system comprising a structure having a noise emitting surface, the method comprising steps of:

I) Providing a damping element of the present invention,
II) Applying the damping element to the noise emitting surface such that the first layer is arranged between the noise emitting surface and the second layer of the damping element.

According to one or more embodiments, the expansion material is in its non-expanded state and the method for preparing a vibration and/or noise damped system comprises a further step of expanding the first layer of the damping element by heating.

According to one or more embodiments, the first layer is expanded before or after the damping element has been applied to the noise emitting surface. The temperature to which the first layer is heated during the expanding step depends on the embodiment of the damping element, particularly on the composition of the expansion material. According to one or more embodiments, the first layer is expanded by heating to a temperature in the range of 100-250° C., preferably of 115-225° C., more preferably 125-200° C. Preferred duration of the expanding step also depends on the embodiment of the damping element. According to one or more embodiments, the duration of the expanding step is 1-90 min, preferably 3-60 min, more preferably 4-30 min.

According to one or more embodiments, the structure of the vibration and/or noise damped system is part of a transportation vehicle or a white good, preferably a part of a dishwasher.

Another subject of the present invention is a vibration and/or noise damped system comprising a structure (5) having a noise emitting surface (6) and a damping element (1) of the present invention, wherein least a portion of the first major surface of the first layer (2) is directly adhered to the noise emitting surface (6), and wherein said structure (5) having the noise emitting surface (6) is preferably part of a transportation vehicle or a white good, preferably of a part of a dishwasher.

Figure 2:
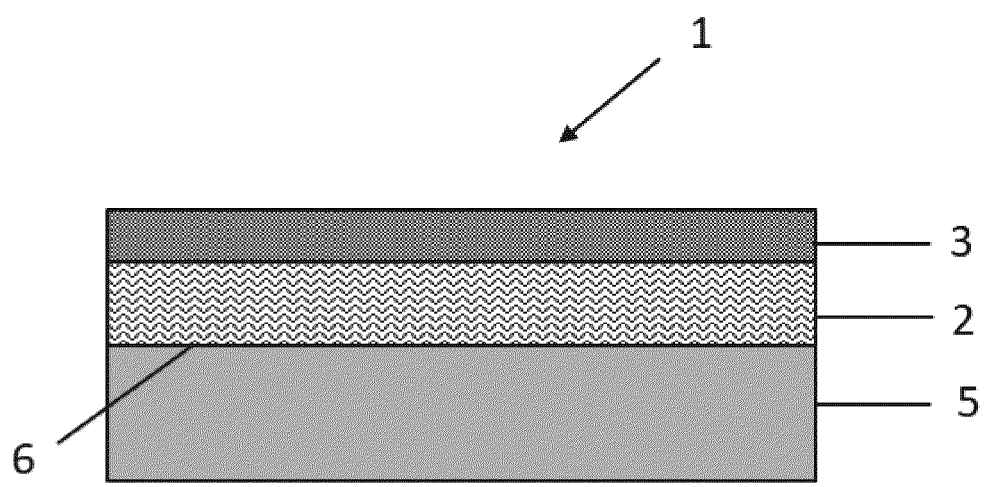
FIG. 2 shows a cross-section of a vibration and/or noise damped system comprising a structure (5) having a noise emitting surface (6) and a damping element (1) comprising a first layer (2) and second layer (3), wherein the first layer (2) is sandwiched between the noise emitting surface (6) and the second layer (3).

According to one or more embodiments, the expansion material of the first layer is in its expanded state. A cross-section of such vibration and/or noise damped system is shown in FIG. 2.

Still another subject of the present invention is a method for reinforcing a structure of a transportation vehicle, the method comprising steps of:

I') Providing an expansion material and
II') Applying the expansion material with a reinforcing layer to a surface of the structure such that the expansion material is arranged between the surface of the structure and the reinforcing layer, wherein the expansion material is composed of the thermally expandable composition of the present invention in its expanded or non-expanded state.

Suitable materials for the reinforcing layer include paper, metals, such as steel and aluminum, fiber materials, such as organic and inorganic fibers, plastics, fiber-reinforced plastic, bitumen, and epoxide resin.

According to one or more embodiments, the reinforcing layer is a metal sheet, preferably aluminum or steel sheet or a polymeric sheet, preferably glass fiber reinforced polymer sheet. The thickness of the reinforcing layer is not particularly restricted but the use of reinforcing layers that are thinner than the expansion material is generally preferred. Preferred thickness also depends on the material of the reinforcing layer. According to one or more embodiments, the reinforcing layer has a thickness of 0.025-1.0 mm, preferably 0.05-0.85 mm, more preferably 0.1-0.65 mm.

It is preferred that the reinforcing layer has an elastic modulus, which is larger than that of the expansion material, such larger by at least the factor 3, preferably at least the factor 5, more preferably at least a factor of 10, wherein the elastic modulus is measured by using the method as defined in ISO 6892-1:2016 standard (for metallic sheets) or as defined in ISO 527-2:2012 standard (for polymeric sheets).

According to one or more embodiments, the expansion material covers at least 50%, preferably at least 65%, more preferably at least 75%, even more preferably at least 85%, still more preferably at least 95%, of the surface of the reinforcing layer.

According to one or more embodiments, the surface of the reinforcing layer covered with the expansion material has an area of at least 0.1 m², preferably at least 0.5 m², more preferably at least 1.0 m².

According to one or more embodiments, the structure of a transportation vehicle is a roof element.

EXAMPLES

The followings products shown in Table 1 were used in the examples.

TABLE 1

| | |
|---|---|
| P1 | Ethylene vinyl acetate copolymer resin, vinyl acetate content 28 wt.-%, MFI (190° C., 2.16 kg) 300-400 g/10 min (ASTM D1238) |
| P21 | Random copolymer of ethylene and butyl acrylate, butyl acrylate content 30-40 wt.-%, MFI (190° C., 2.16 kg) 30-50 g/10 min (ISO 1133) |
| P22 | Random copolymer of ethylene and butyl acrylate, butyl acrylate content 30-40 wt.-%, MFI (190° C., 2.16 kg) 250-350 g/10 min (ISO 1133) |
| P3 | Low density polyethylene, MFI (190° C., 2.16 kg) 125-150 g/10 min (ISO 1133) |
| TR1 | C5 hydrocarbon resin, softening point (E-950) 90-100° C. |
| TR2 | C9 aromatic hydrocarbon resin, softening point 95-105° C. |
| TR3 | C5 hydrocarbon resin, softening point 95-105° C. |
| AP | Random terpolymer of ethylene, acrylic ester, and glycidyl methacrylate, glycidyl methacrylate content 5-10 wt.-%, MFI (190° C., 2.16 kg) 5-10 g/10 min (ISO 1133) |
| CBA1 | Mixture of azodicarbonamide, 4,4'-oxydi (benzenesulphonohydrazide, and ZnO |
| CBA2 | Sodium hydrogen carbonate |
| PBA1 | Expandable polymer microspheres, unexpanded number average particle size 36 µm, expansion initiation temperature 124° C. |
| PBA2 | Expandable polymer microspheres, unexpanded particle size 28-38 µm, expansion initiation temperature 133-143° C. |
| MF | Calcium carbonate, grain size 0-15 µm |

TABLE 1-continued

| | |
|---|---|
| FW | Wood flour, $d_{50}$ particle size 170-220 μm, $d_{90}$ particle size 270-320 μm (80% beech, 20% birch |

Preparation of Thermally Expandable Compositions

All inventive and reference example compositions were produced on standard production equipment suitable to compound thermoplastics with temperature control, i.e. twin-screw extruder, Buss kneader or Banbury mixer.

Thermal Conductivity

The thermal conductivities of the thermally expandable compositions were determined using a THB-1 Transient Hot Bridge thermal conductivity meter (from Company Linseis).

TABLE 2

| Compositions, wt.-% | Ref-1 | Ref-2 | Ex-1 | Ref-3 | Ex-2 | Ex-3 |
|---|---|---|---|---|---|---|
| P1 | | — | — | 25.00 | 25.00 | 35.00 |
| P21 | | 25.53 | 25.64 | 3.00 | 3.00 | — |
| P22 | | 24.71 | 24.81 | 3.00 | 3.00 | — |
| P3 | | — | — | — | — | 11.00 |
| TR1 | | 6.06 | 6.09 | 12.50 | 12.50 | — |
| TR2 | | — | — | 5.00 | 5.00 | 10.00 |
| TR3 | | — | — | — | — | 7.00 |
| AP | | 11.57 | 11.62 | 1.00 | 1.00 | 6.00 |
| CBA1 | | 7.41 | 2.89 | — | 3.00 | — |
| CBA2 | | — | — | — | — | 7.50 |
| PBA1 | | — | — | 3.50 | 3.50 | 2.00 |
| PBA2 | | — | 4.14 | — | — | 1.50 |
| MF | | 24.71 | 24.81 | 47.00 | 44.00 | 10.00 |
| FW | | — | — | — | — | 10.00 |
| Total | | 100.00 | 100.00 | 100.00 | 100.00 | 100.00 |
| Density before expansion, g/cm³ | | 1.102 | n/a | 1.364 | 1.308 | 1.040 |
| Density expanded 8 min @ 160° C., g/cm³ | | n/a | n/a | 0.176 | 0.159 | 0.160 |
| Expansion rate, % | | n/a | 380 | 775 | 823 | 650 |
| Thermal conductivity, W/m*K | 0.8 | n/a | 0.08 | 0.091 | 0.042 | 0.050 |

In a first step, the polymers (P), the tackifying resins (TR), the adhesion promoter (AP), and the fillers (F) were mixed in a kneader at a temperature 80-90° C. for 20 minutes until a homogeneously mixed mixture was obtained. Heat reactive raw materials (CBA, PBA) were then added into the system and mixed for another 10 minutes until a homogeneously mixed mixture was obtained. Care was taken that the temperature did not exceed 110° C. during the mixing steps. The obtained material was subsequently hot-pressed into test sheets having a thickness of ca. 1 mm that were used for testing of the properties of the thermally expandable compositions.

The composition of reference example Ref-1 was a non-foamed standard white good acoustical bitumen sheet SikaDamp-112 (from Sika AG)

Expansion Rate

Expansion properties were tested by heat treating (baking) the sample sheets in a hot air oven for 8 minutes at a temperature of 160° C. The expansion rates were then calculated as a relative density decrease $\delta_0/\delta_{exp} \cdot 100\%$, wherein $\delta_{exp}$ is the density of the composition in an expanded state and $\delta_0$ is the density of the composition in original non-expanded state.

In case of the thermally expandable composition of Ref-2, no stable foam could be formed.

Measurement of Density

The densities of the test sheets before and after the expansion were measured according to DIN EN ISO 1183-1:2019 standard using a water immersion method (Archimedes principle) in deionized water and a precision balance to measure the mass of the test specimens.

The invention claimed is:

1. A thermally expandable composition comprising:
    a1) at least one polymer P,
    a2) at least one chemical blowing agent CBA,
    a3) at least one physical blowing agent PBA, and
    a4) at least one filler F,
    wherein the at least one physical blowing agent PBA is composed of expandable microspheres, and
    wherein the thermally expandable composition is essentially free of epoxy resins having an average of more than one epoxy group per molecule.

2. The thermally expandable composition according to claim 1, wherein the at least one physical blowing agent PBA is composed of expandable polymer microspheres.

3. The thermally expandable composition according to claim 1, wherein the weight ratio of the amount of at least one chemical blowing agent CBA to the amount of the at least one physical blowing agent PBA is in the range of 5:1 to 1:5.

4. The thermally expandable composition according to claim 1, wherein the at least one physical blowing agent PBA has an initiation expansion temperature in the range of 75-185° C.

5. The thermally expandable composition according to claim 1, wherein the at least one polymer P comprises 5-85 wt.-% of the total weight of the thermally expandable composition.

6. The thermally expandable composition according to claim 1, wherein the at least one filler F comprises 1.5-75 wt.-% of the total weight of the thermally expandable composition.

7. The thermally expandable composition according to claim 1, wherein the at least one filler F comprises at least one mineral filler MF and/or at least one cellulose-containing filler FW.

8. The thermally expandable composition according to claim 1, wherein the composition contains less than 0.25 wt.-% of epoxy resins having an average of more than one epoxy group per molecule, based on the total weight of the thermally expandable composition.

9. The thermally expandable composition according to claim 1, wherein the at least one polymer P is selected from the group consisting of ethylene vinyl acetate copolymers, polyolefins, olefin (meth)acrylate copolymers, olefin alkyl (meth)acrylate copolymers, and olefin (meth)acrylic acid copolymers.

10. A damping element comprising a first layer composed of an expansion material and a second layer composed of an acoustic damping material,
wherein the expansion material has an expansion rate of at least 100%, and
wherein the acoustic damping material comprises:
b1) a bitumen component BC or a polymer component PC,
b2) at least one hydrocarbon resin HR,
b3) optionally at least one wax W,
b4) optionally at least one plasticizer PL, and
b5) At least 25 wt.-% based on the total weight of the acoustic damping material, of at least one solid particulate filler PF.

11. The damping element according to claim 10, wherein the expansion material in its non-expanded state is thermally activatable and has an activation temperature in the range of 85-225° C.

12. The damping element according to claim 10, wherein the expansion material comprises 5-85 wt.-% based on the total weight of the expansion material, of at least one polymer.

13. The damping element according to claim 10, wherein the expansion material comprises 1.5-70 wt.-% based on the total weight of the expansion material, of at least one filler.

14. The damping element according to claim 10, wherein the expansion material comprises in its non-expanded state at least one chemical foaming agent and/or at least one physical foaming agent.

15. The damping element according to claim 10, wherein the expansion material is composed of the thermally expandable composition in its expanded or non-expanded state.

16. The damping element according to claim 15, wherein the thermally expandable composition comprises:
a1) at least one polymer P,
a2) at least one chemical blowing agent CBA,
a3) at least one physical blowing agent PBA, and
a4) at least one filler F,
wherein the at least one physical blowing agent PBA is composed of expandable microspheres, and
wherein the thermally expandable composition is essentially free of epoxy resins having an average of more than one epoxy group per molecule.

17. The damping element according to claim 10, wherein the acoustic damping material comprises:
b1) 20-65 wt.-% of the bitumen component BC,
b2) 0.1-10 wt.-% of the at least one hydrocarbon resin HR, and
b3) 0-10 wt.-% of the at least one wax W, all the proportions being based on the total weight of the acoustic damping material.

18. A transportation vehicle comprising the damping element according to claim 10.

19. A method for preparing a vibration and/or noise damped system comprising a structure having a noise emitting surface, the method comprising steps of:
I) providing a damping element according to claim 8,
II) applying the damping element to the noise emitting surface such that the first layer is arranged between the noise emitting surface and the second layer of the damping element.

20. The method according to claim 19, wherein the expansion material is in its non-expanded state and the method comprises a further step of expanding the first layer of the damping element by heating.

21. The method according to claim 20, wherein first layer of the damping element is expanded before or after the damping element has been applied to the noise emitting surface.

22. The method according to claim 19, wherein the structure is part of a transportation vehicle or a white good.

23. A vibration and/or noise damped system comprising a structure having a noise emitting surface and a damping element according to claim 10, wherein least a portion of the first major surface of the first layer is directly adhered to the noise emitting surface.

24. A method for reinforcing a structure of a transportation vehicle, the method comprising steps of:
I') providing an expansion material,
II') applying the expansion material with a reinforcing layer to a surface of the structure such that the expansion material is arranged between the surface of the structure and the reinforcing layer, wherein
the expansion material is composed of the thermally expandable composition according to claim 1 in its expanded or non-expanded state.

25. The method according to claim 24, wherein the structure of the transportation vehicle is a roof element.

* * * * *